US011677302B2

(12) United States Patent
Iwamoto et al.

(10) Patent No.: US 11,677,302 B2
(45) Date of Patent: Jun. 13, 2023

(54) COIL FORMING APPARATUS AND COIL FORMING METHOD

(71) Applicant: ODAWARA ENGINEERING CO., LTD., Kanagawa (JP)

(72) Inventors: Tomomi Iwamoto, Kanagawa (JP); Yutaka Ishizuka, Kanagawa (JP)

(73) Assignee: ODAWARA ENGINEERING CO., LTD., Kanagawa (JP)

( * ) Notice: Subject to any disclaimer, the term of this patent is extended or adjusted under 35 U.S.C. 154(b) by 308 days.

(21) Appl. No.: 16/872,872

(22) Filed: May 12, 2020

(65) Prior Publication Data

US 2020/0274426 A1 Aug. 27, 2020

Related U.S. Application Data

(63) Continuation of application No. PCT/JP2018/036746, filed on Oct. 1, 2018.

(30) Foreign Application Priority Data

Nov. 14, 2017 (JP) ............................ JP2017-218786

(51) Int. Cl.
*H02K 15/085* (2006.01)
*H02K 15/04* (2006.01)

(52) U.S. Cl.
CPC ....... *H02K 15/085* (2013.01); *H02K 15/0421* (2013.01)

(58) Field of Classification Search
CPC ............. H02K 15/085; H02K 15/0421; H02K 15/064; H02K 15/0428
See application file for complete search history.

(56) References Cited

U.S. PATENT DOCUMENTS

| | | | | |
|---|---|---|---|---|
| 2,290,381 | A | 7/1942 | Poole | |
| 2016/0233749 | A1 | 8/2016 | Ueno | |
| 2020/0313525 | A1* | 10/2020 | Falkner ................ | B21D 39/046 |

FOREIGN PATENT DOCUMENTS

| | | | |
|---|---|---|---|
| JP | 2004032964 | A | 1/2004 |
| JP | 2004312946 | A | 11/2004 |

(Continued)

OTHER PUBLICATIONS

Office Action issued in Chinese Appln. No. 201880073788.5 dated Oct. 29, 2021. English translation provided.

(Continued)

*Primary Examiner* — Livius R. Cazan
(74) *Attorney, Agent, or Firm* — Rossi, Kimms & McDowell LLP

(57) ABSTRACT

Grooves are formed at equal intervals in the circumferential direction on an outer peripheral edge of a circular block, and inner rods are housed in these grooves and arranged to be movable radially along radial directions. The outer rods are provided to be movable radially along radial directions, and respectively face the inner rods. Respective one slot insertion portions of coil segments are inserted into gaps between the inner rods and also into the holding member. The respective other slot insertion portions are inserted into gaps between the outer rods. Thereafter, the whole outer rods are rotated to rotate the coil segments around the slot insertion portions, then the holding member is lowered, and the whole outer rods are further rotated without interference between the holding member and the slot insertion portions to bring the coil segments into close contact with one another.

12 Claims, 23 Drawing Sheets

(56) References Cited

FOREIGN PATENT DOCUMENTS

| | | | | |
|---|---|---|---|---|
| JP | 2005065386 | A | * | 3/2005 |
| JP | 2005065386 | A | | 3/2005 |
| JP | 2013165540 | A | | 8/2013 |
| JP | 2016063588 | A | | 4/2016 |

OTHER PUBLICATIONS

Extended European Search Report issued in European Appln. No. 18879096.8 dated Dec. 8, 2020.

English translation of Written Opinion issued in Intl. Appln. No. PCT/JP2018/036746 dated Dec. 25, 2018, previously cited in IDS filed May 12, 2020.

International Preliminary Report on Patentability issued in Intl. Appln. No. PCT/JP2018/036746 dated May 28, 2020. English translation provided.

International Search Report issued in Intl. Appln. No PCT/JP2018/036746 dated Dec. 25, 2018. English translation provided.

Written Opinion issued in Intl. Appln. No. PCT/JP2018/036746 dated Dec. 25, 2018.

* cited by examiner

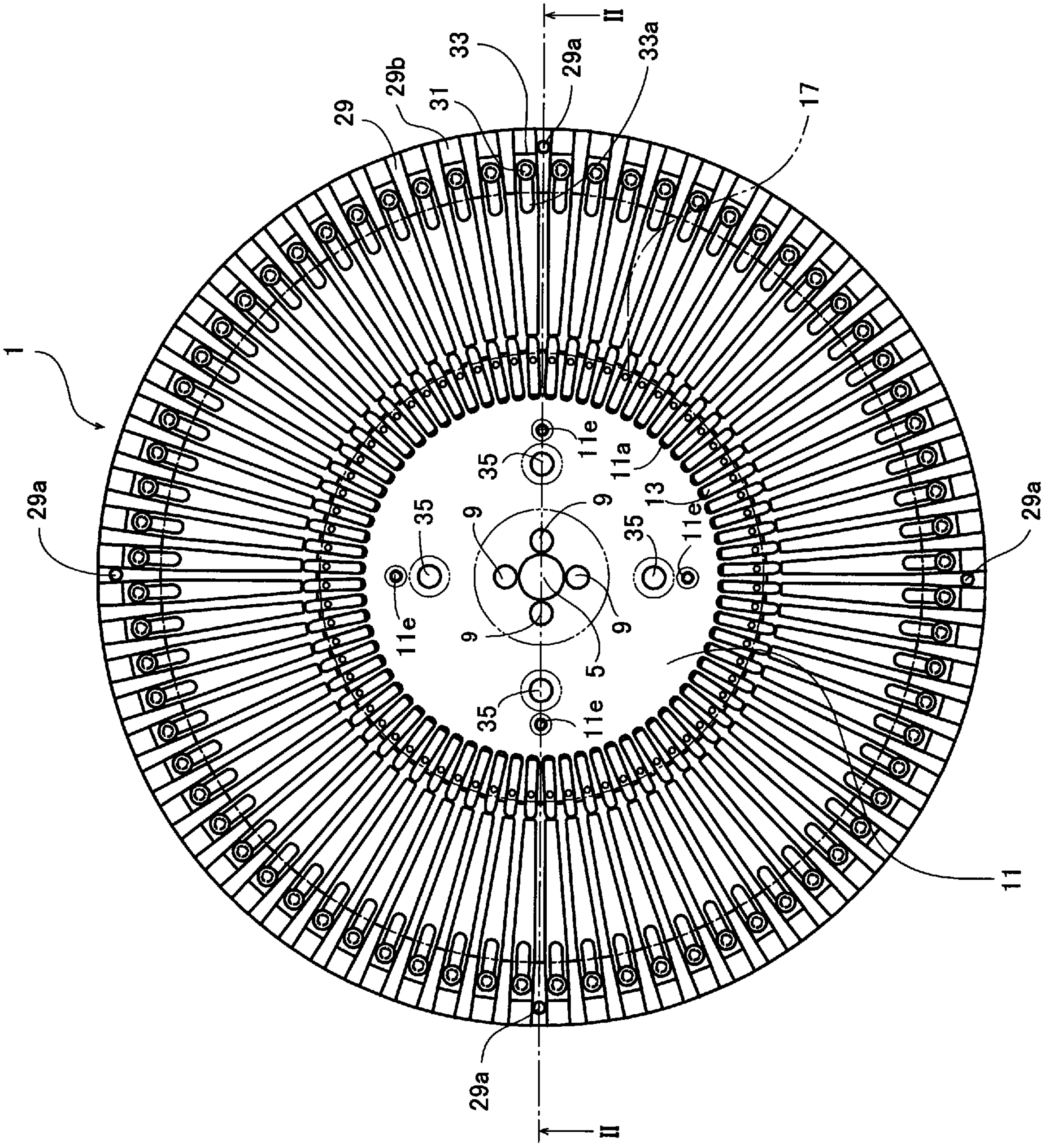
[Fig.1]

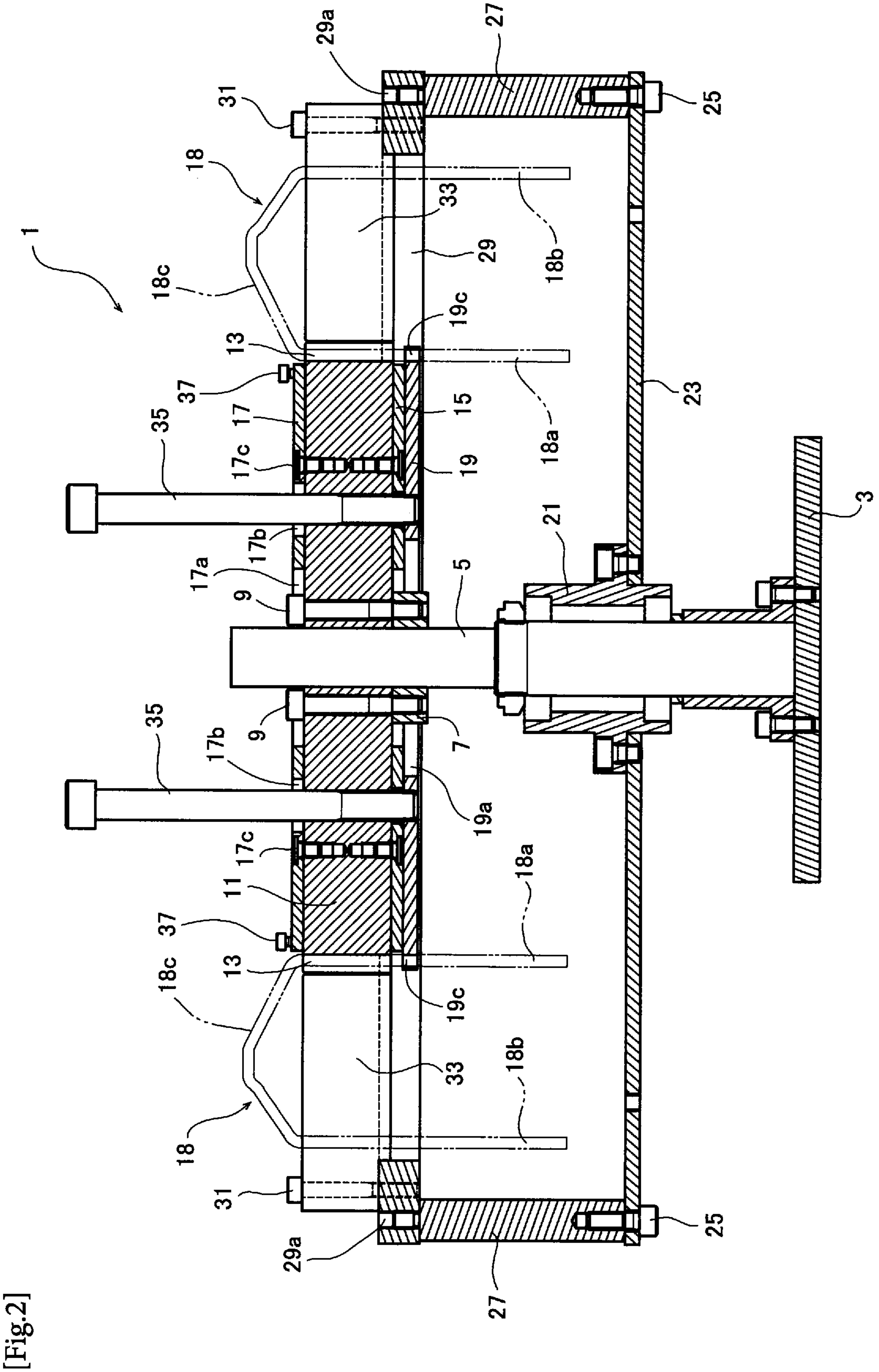
[Fig.2]

[Fig.3A]
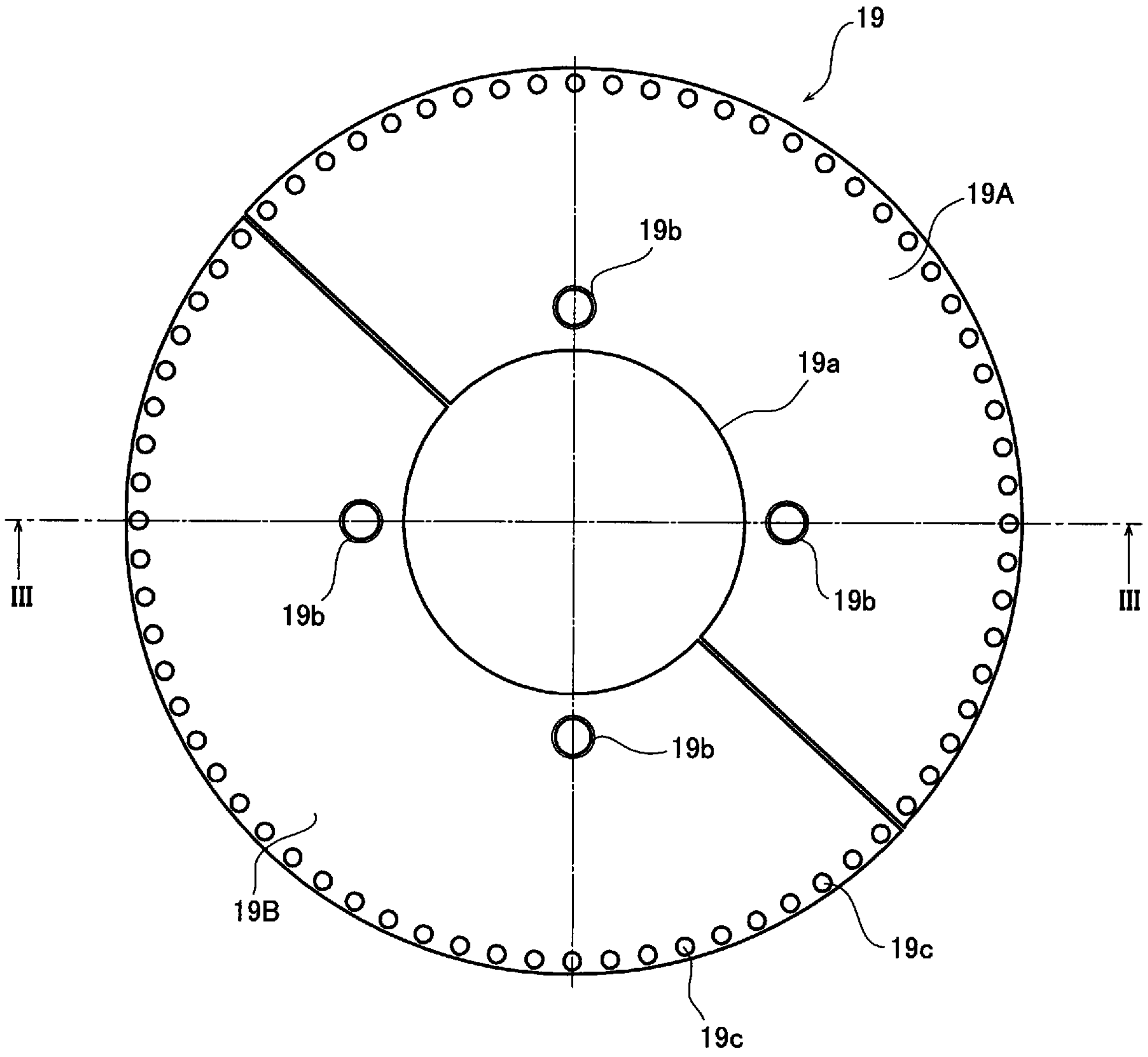
[Fig.3B]
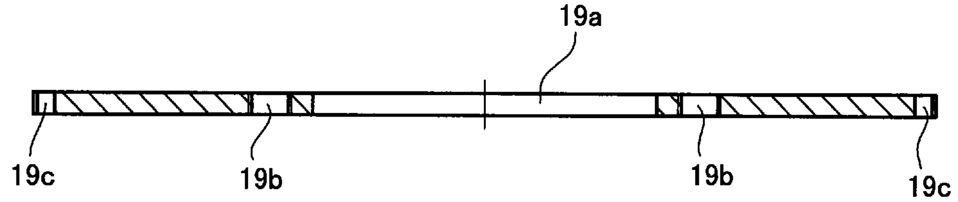

[Fig.4A]
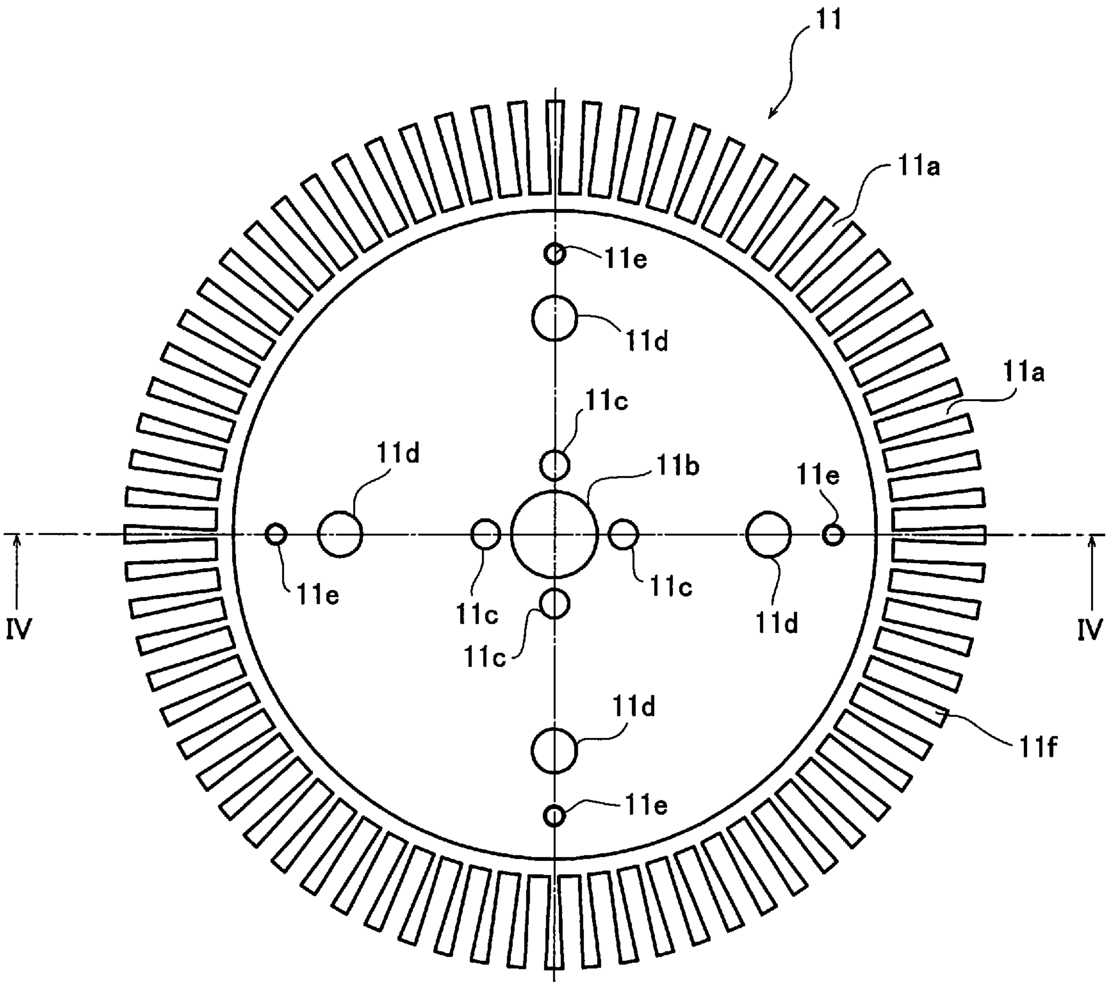
[Fig.4B]
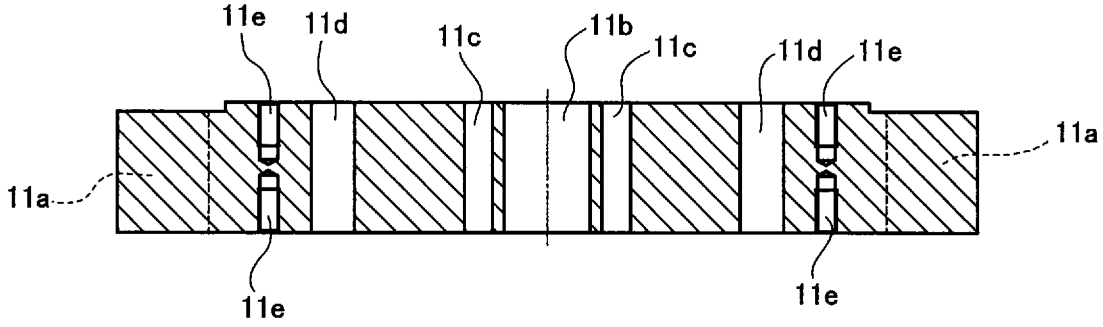

[Fig.5A]
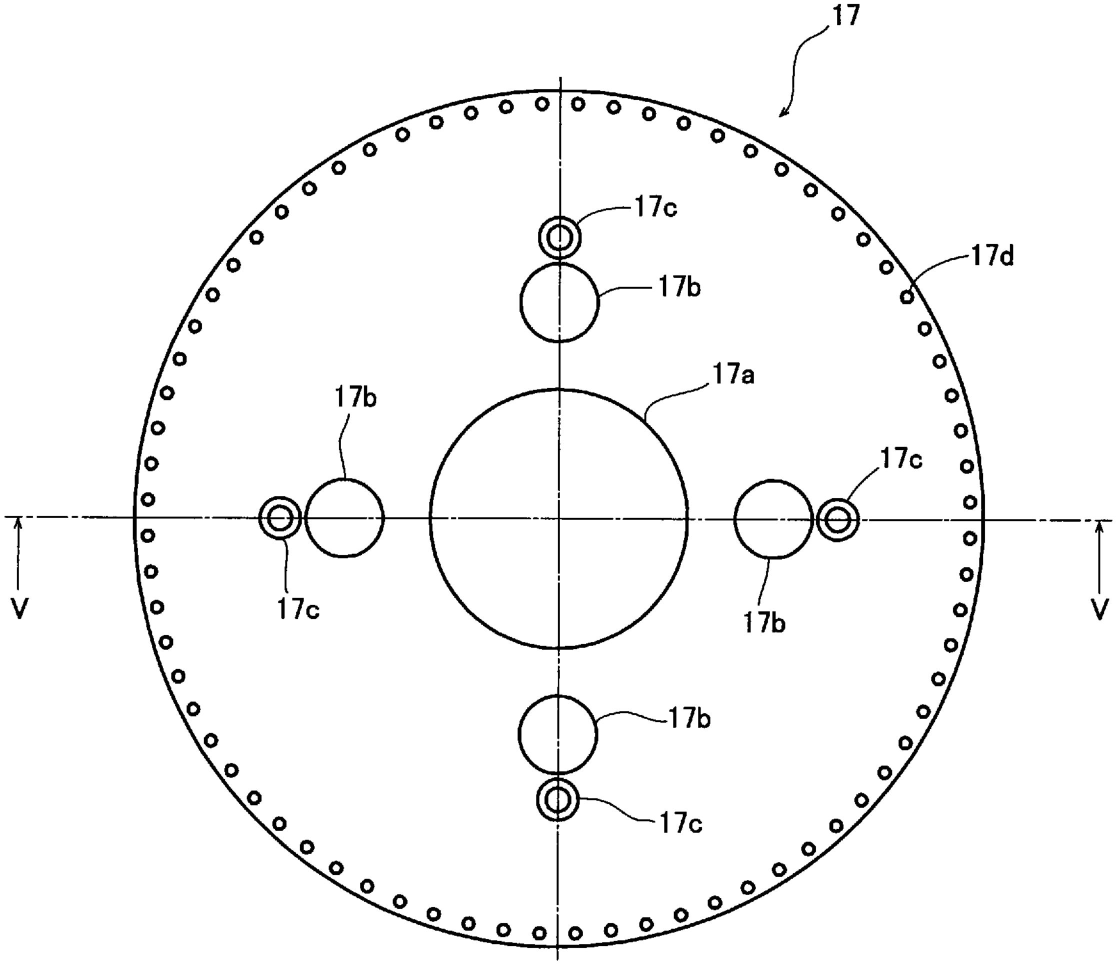
[Fig.5B]
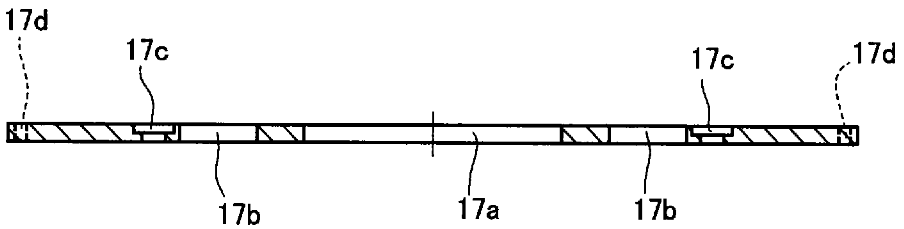

[Fig.6A]
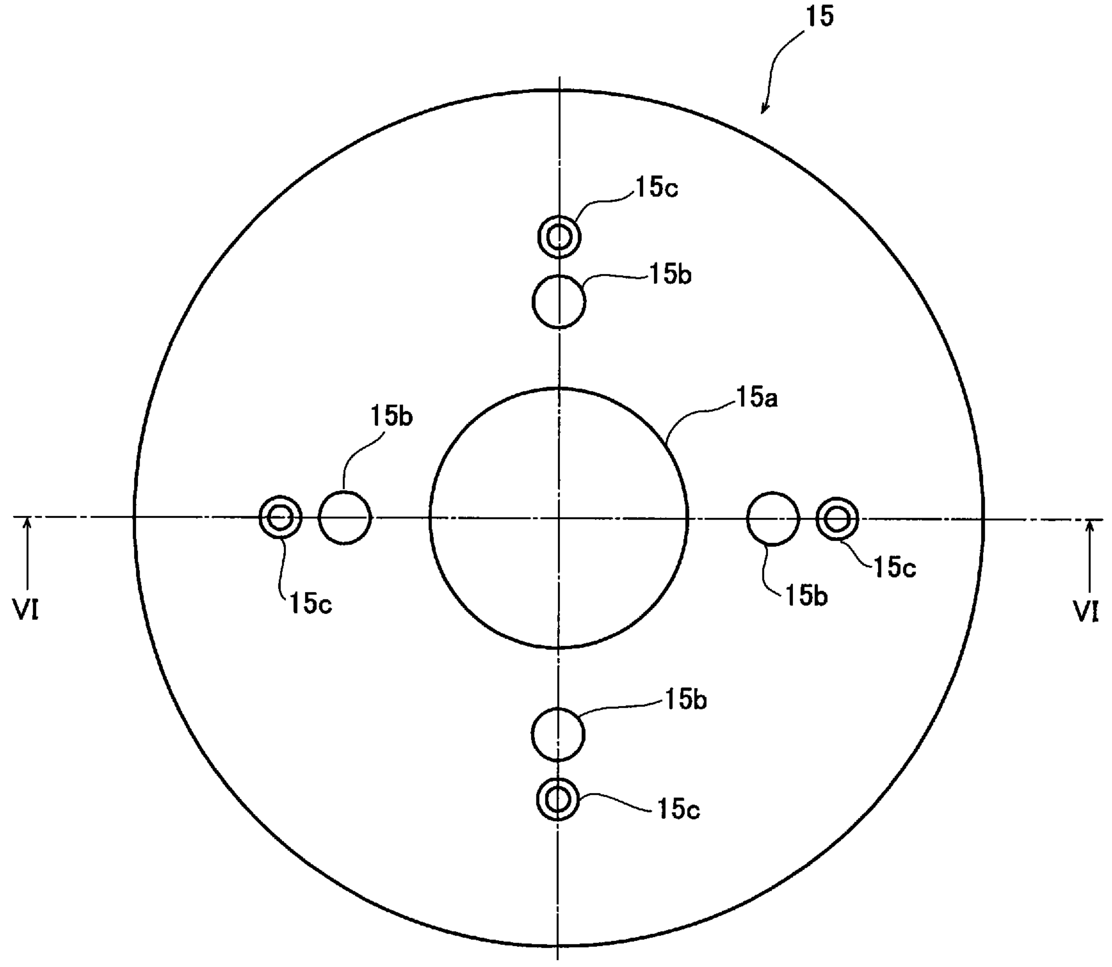
[Fig.6B]
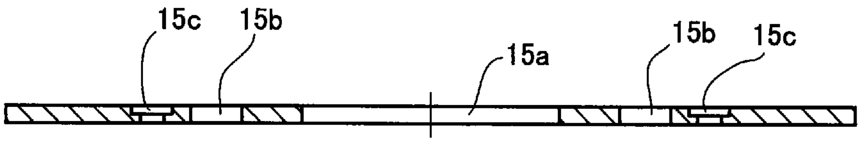

[Fig.7]
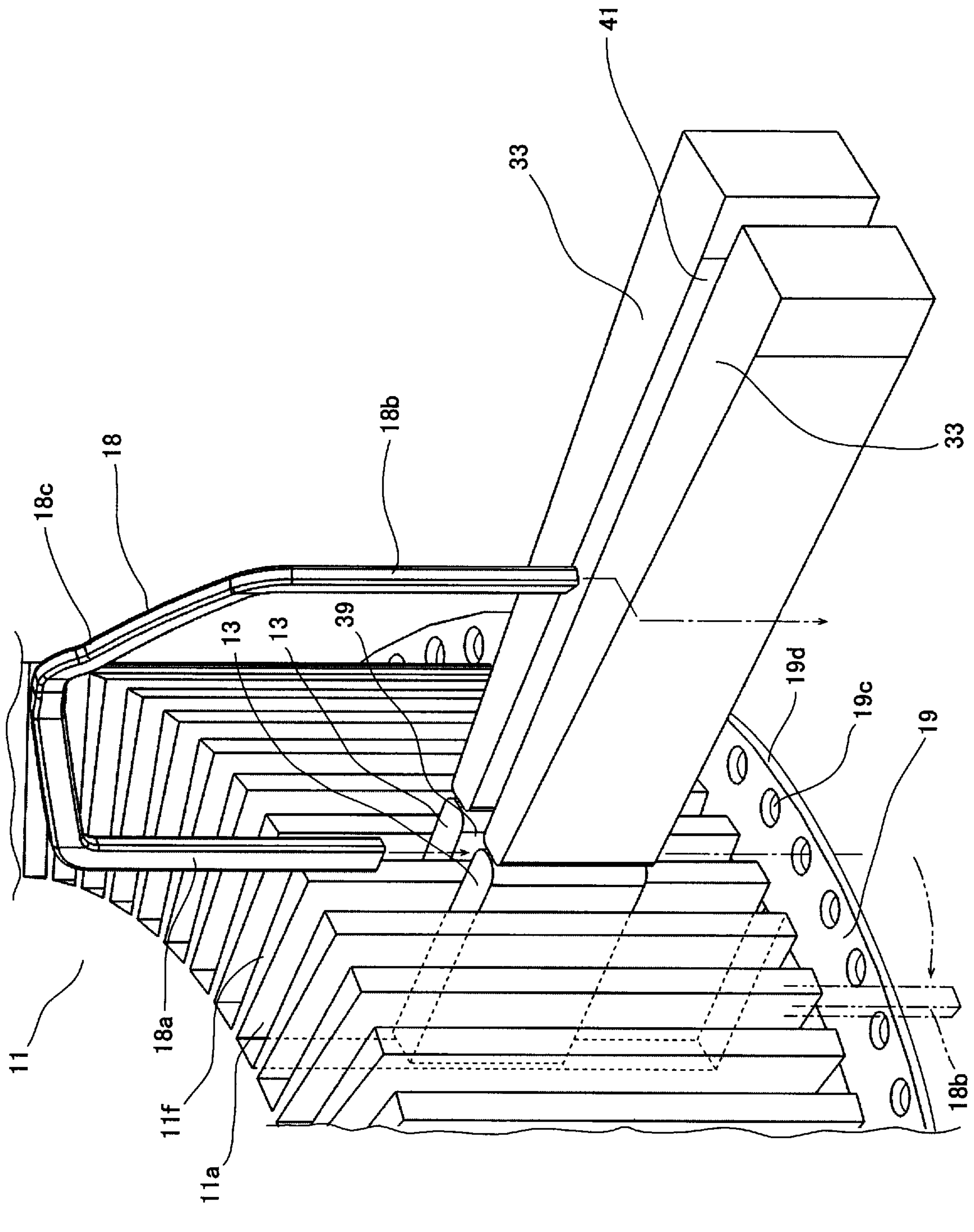

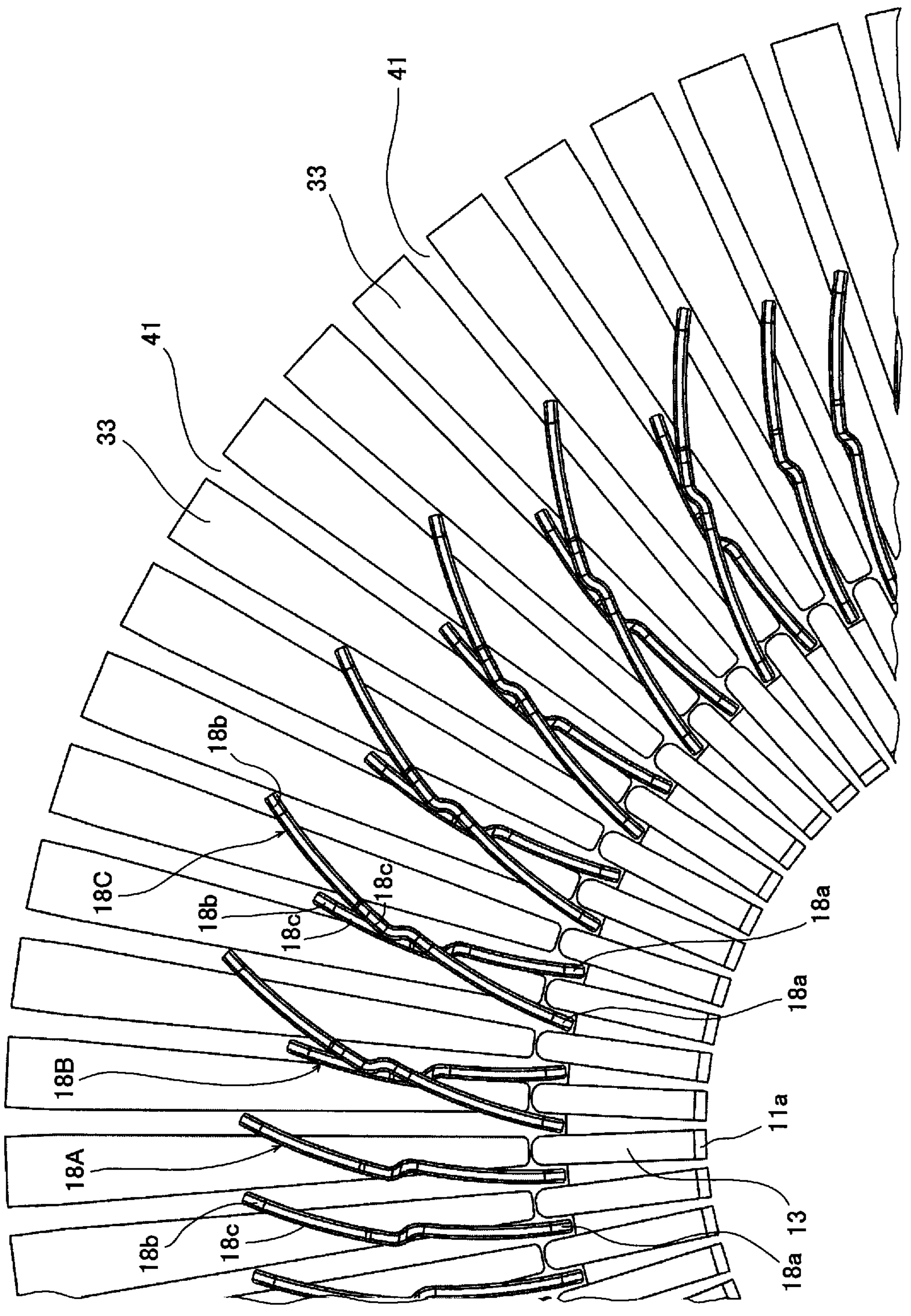
[Fig.8]

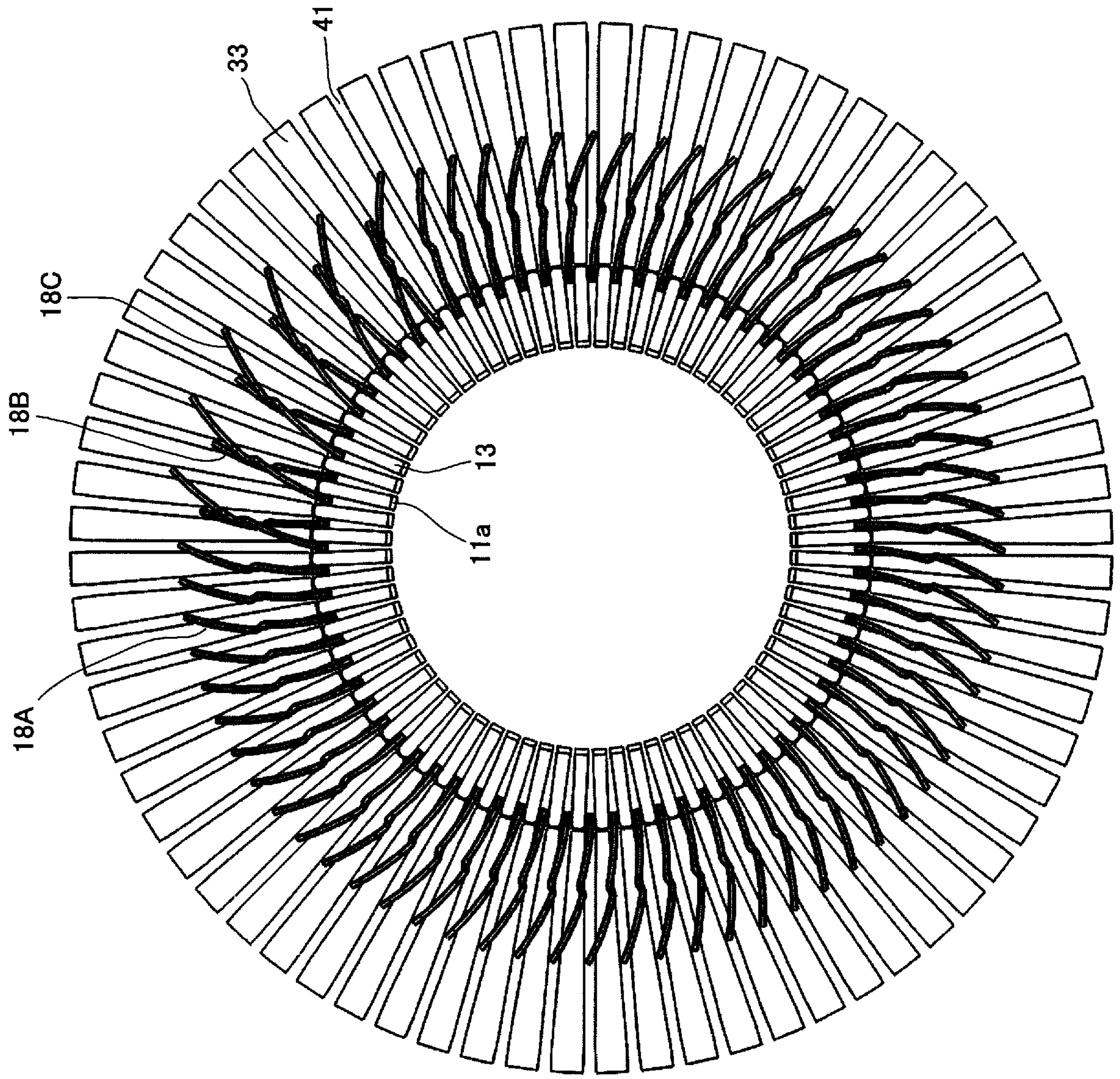
[Fig.9]

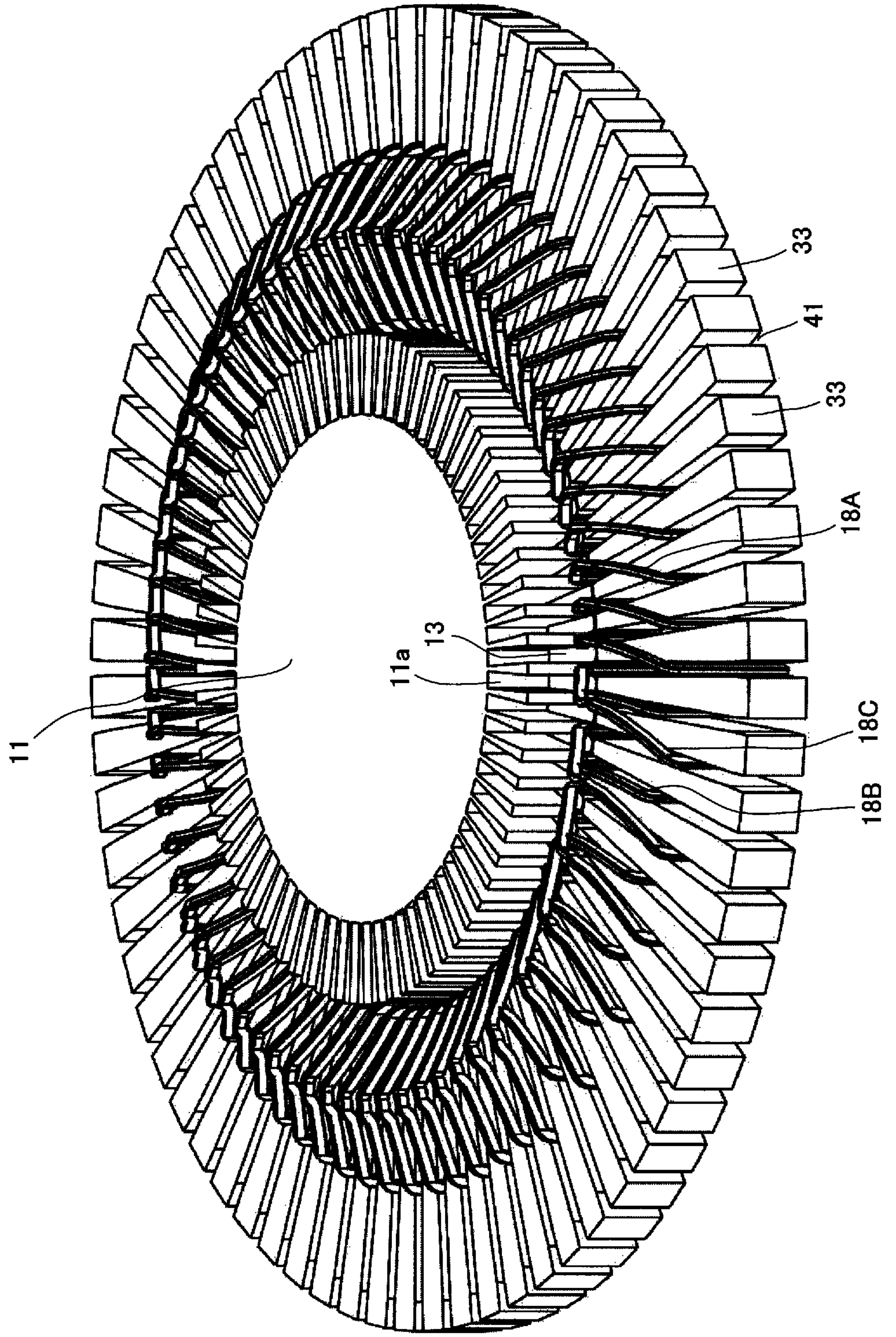
[Fig.10]

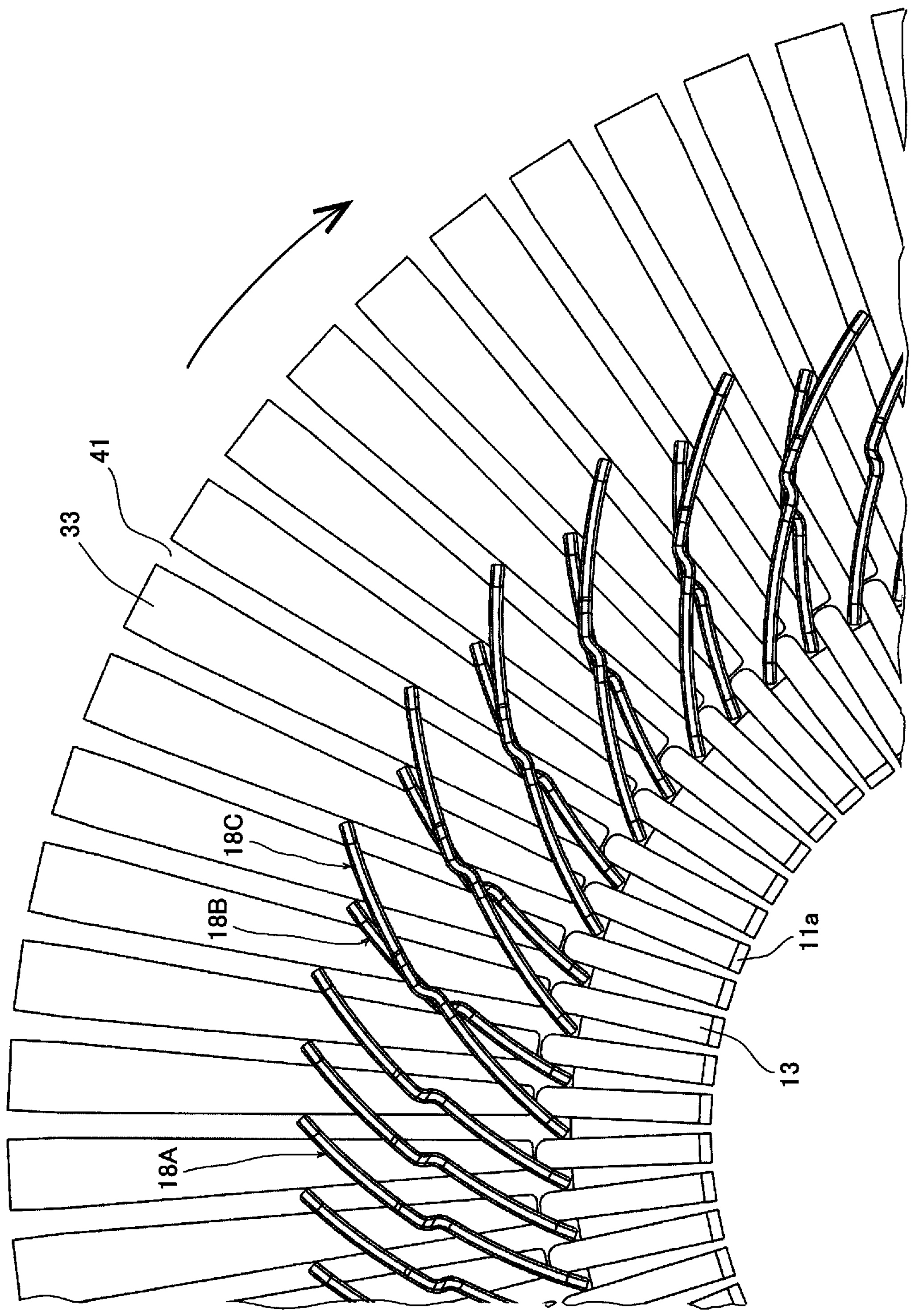
[Fig.11]

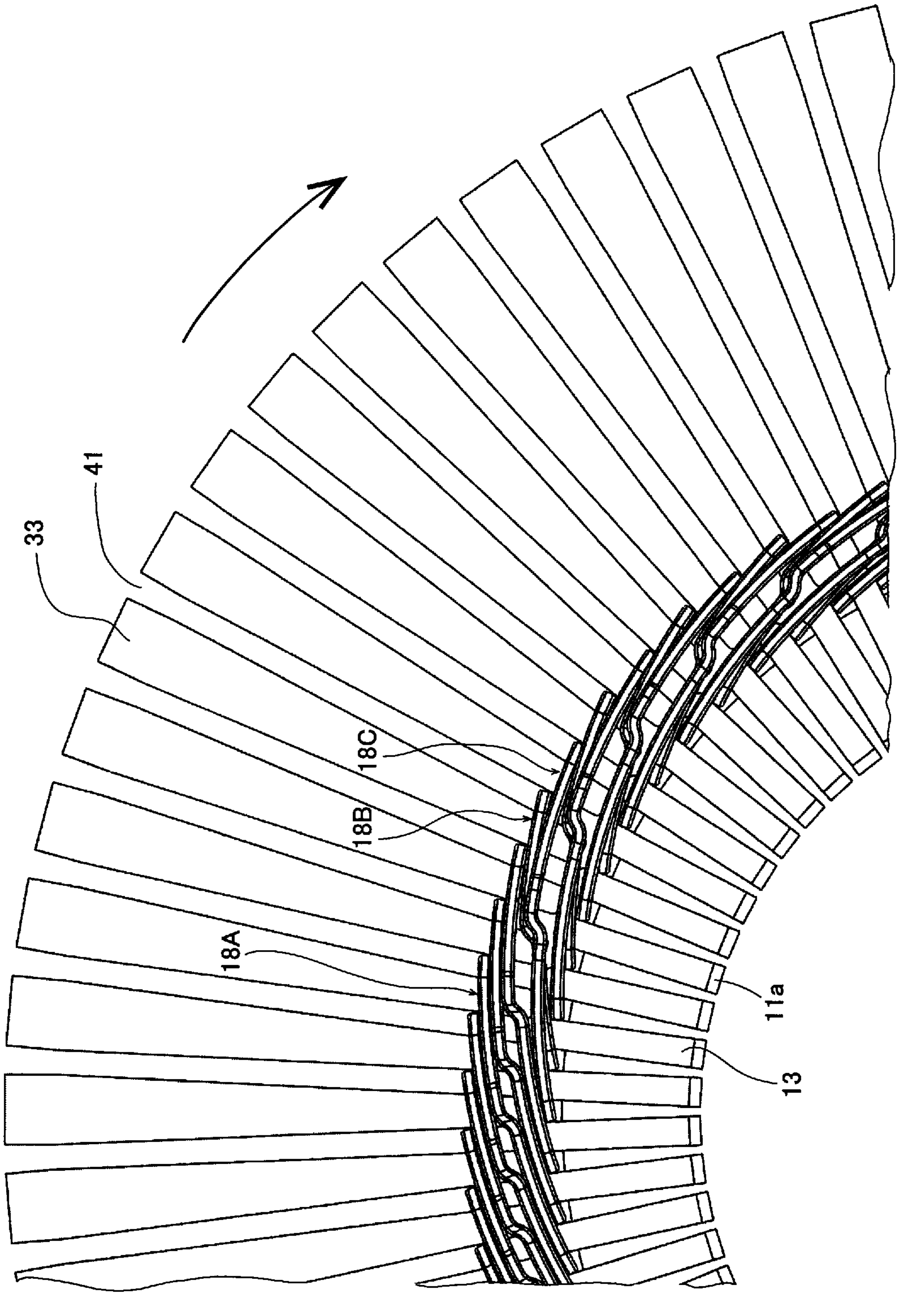
[Fig.12]

[Fig.13]
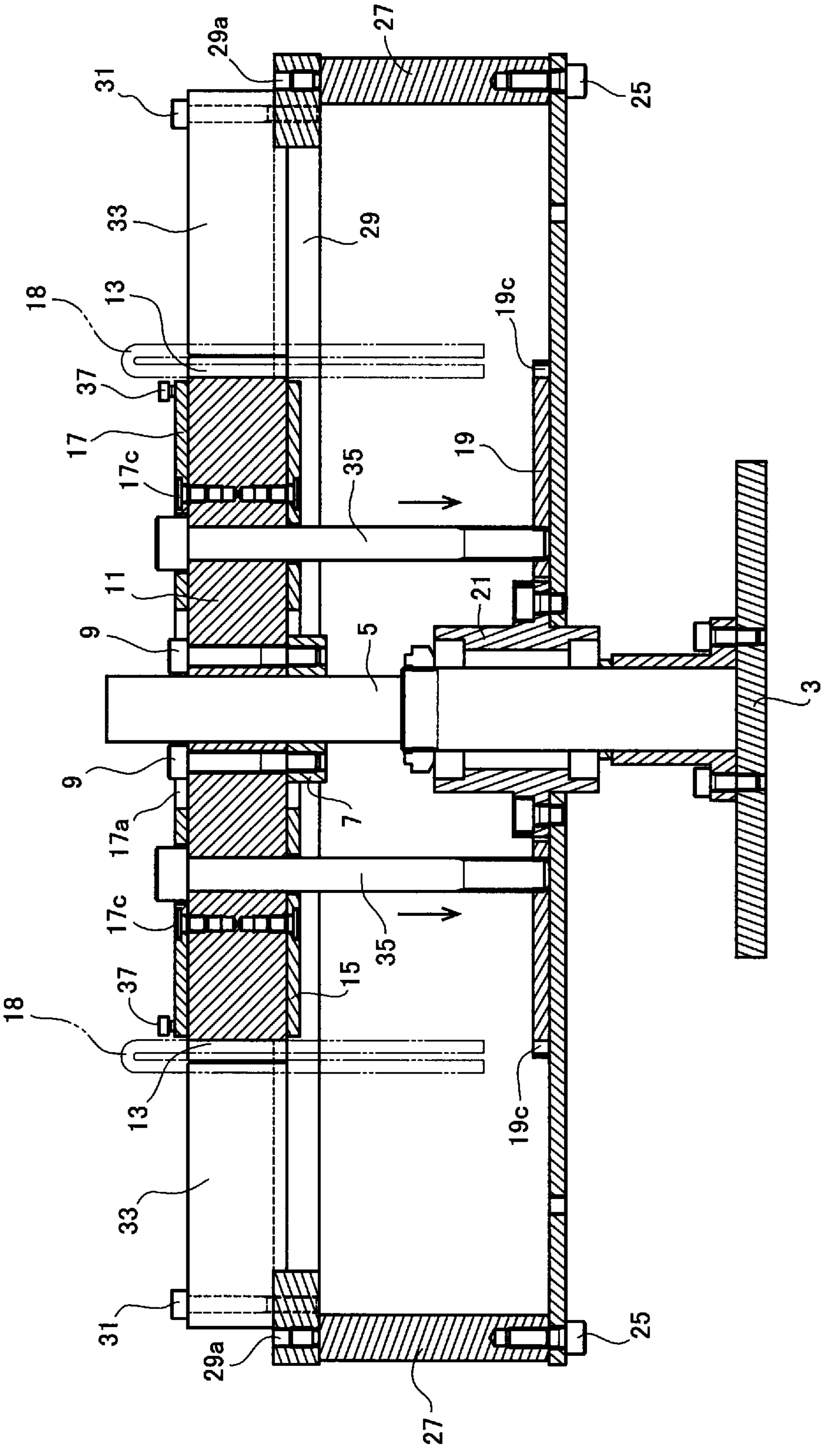

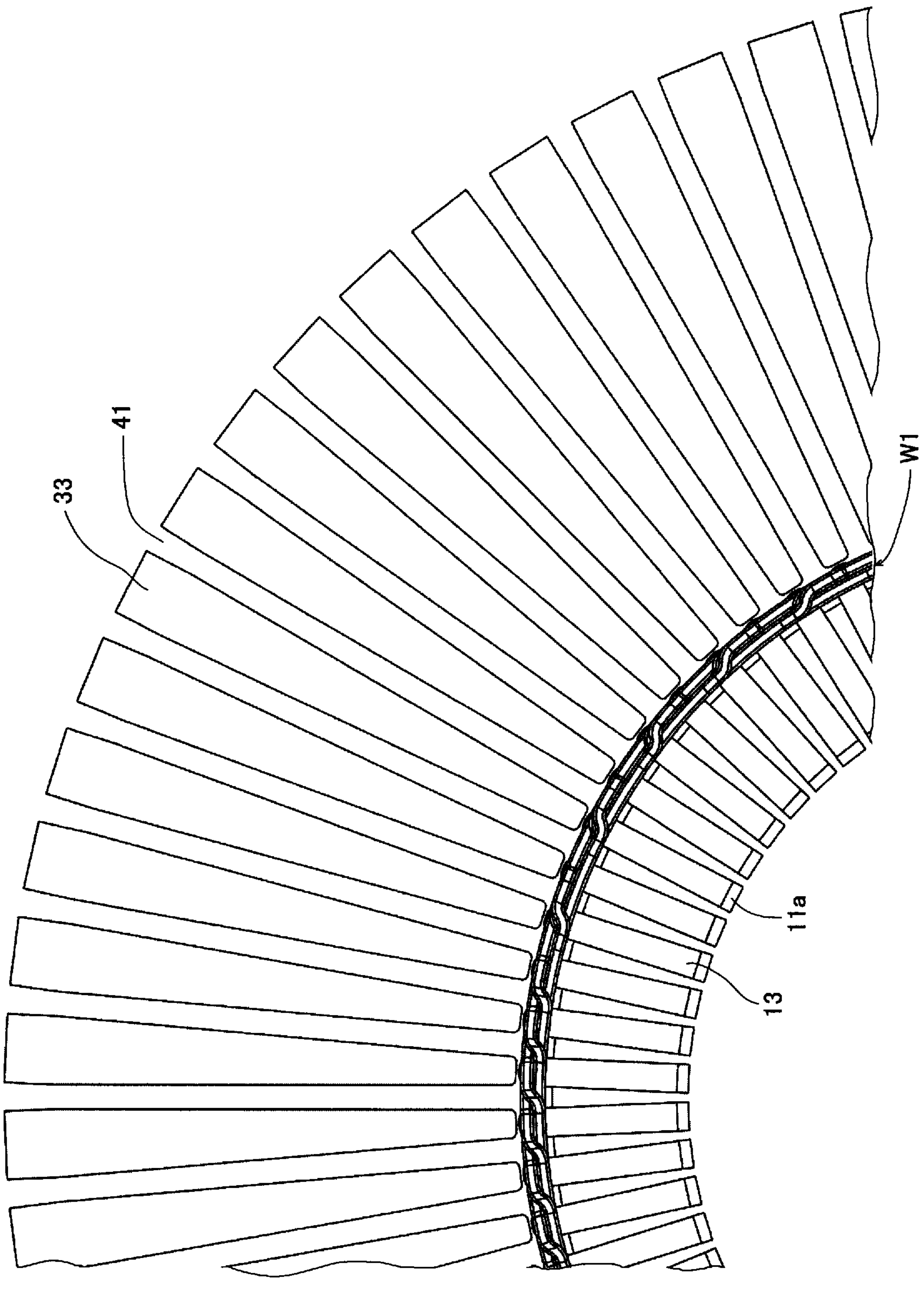
[Fig.14]

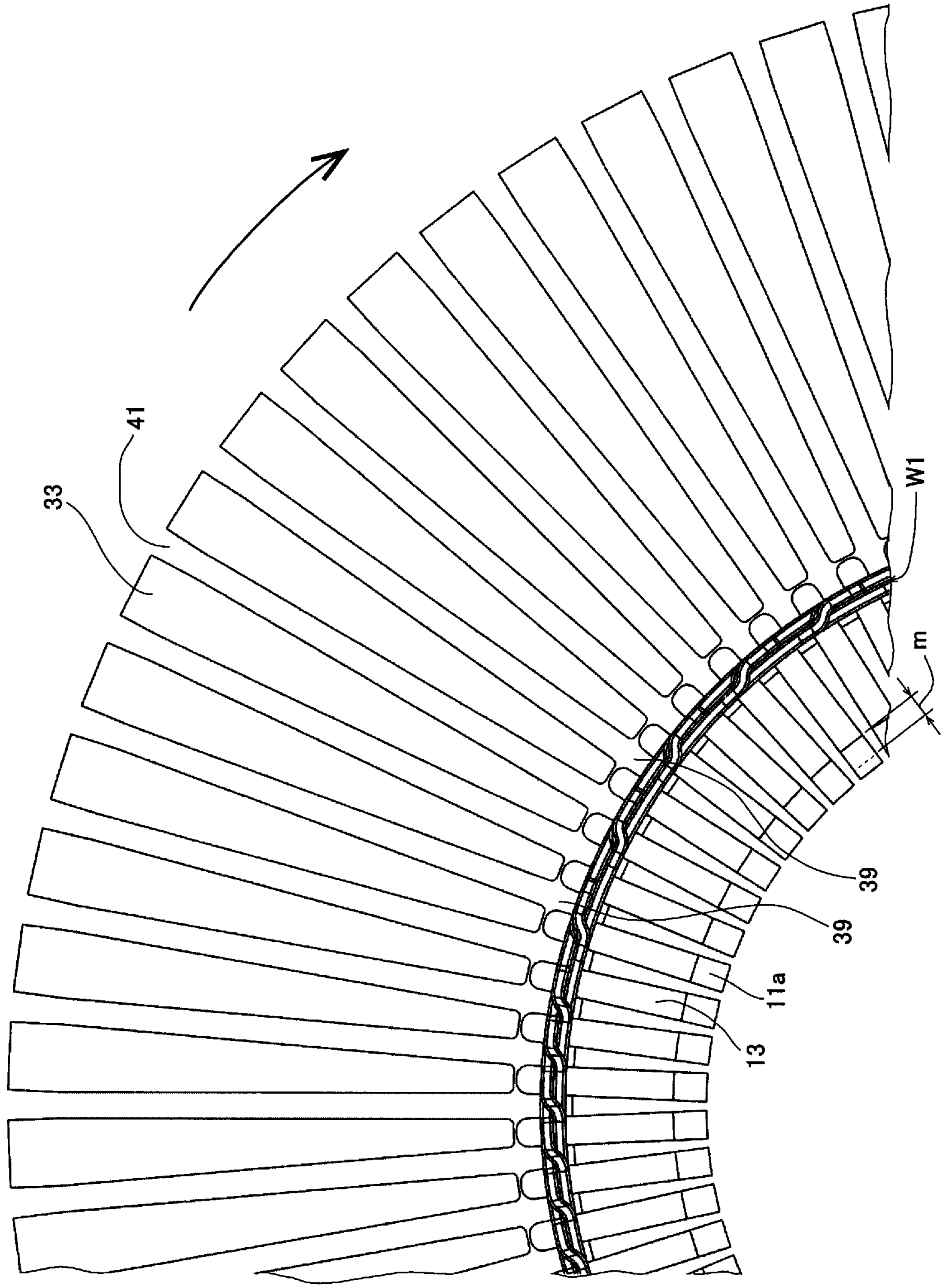
[Fig.15]

[Fig.16]
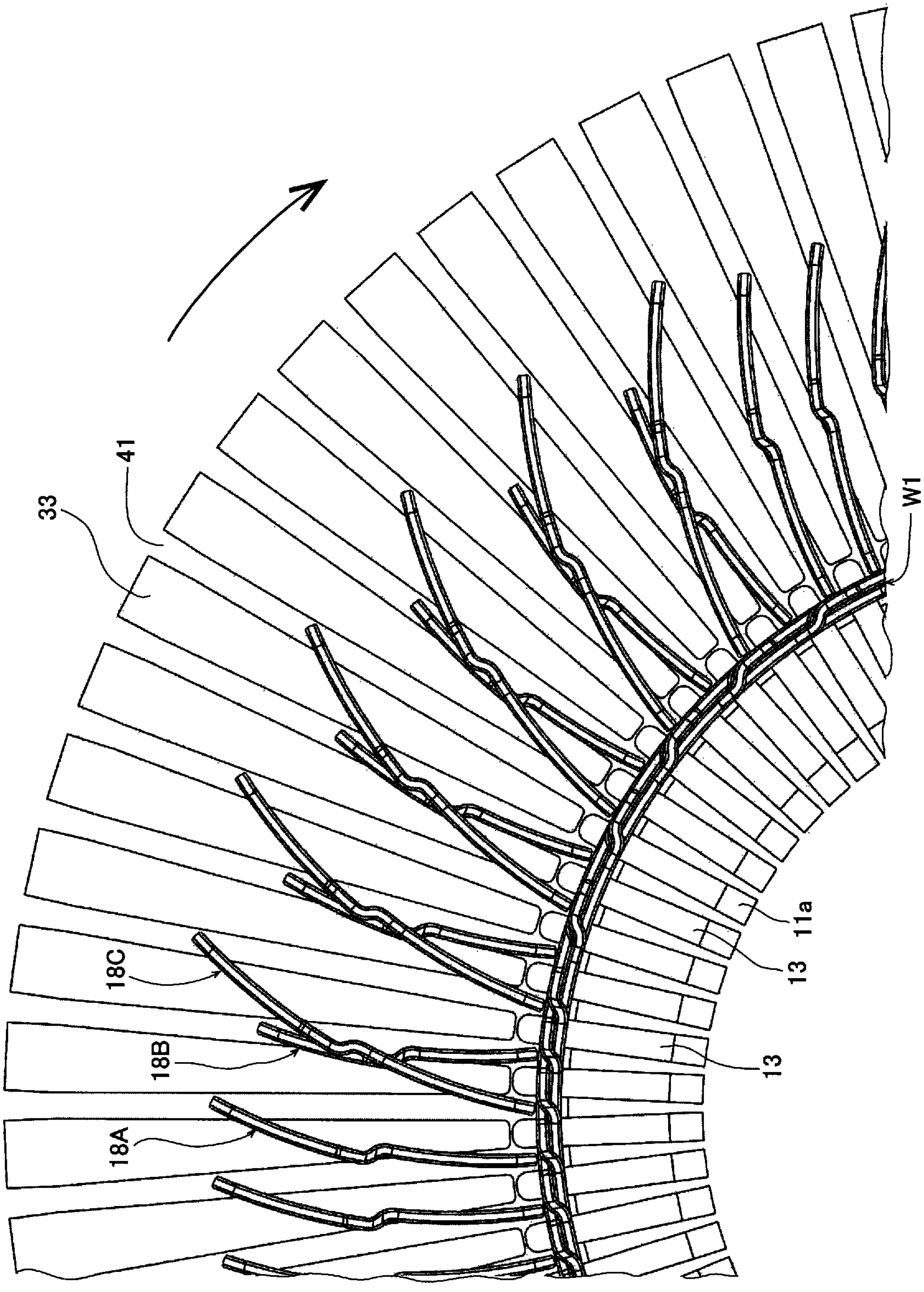

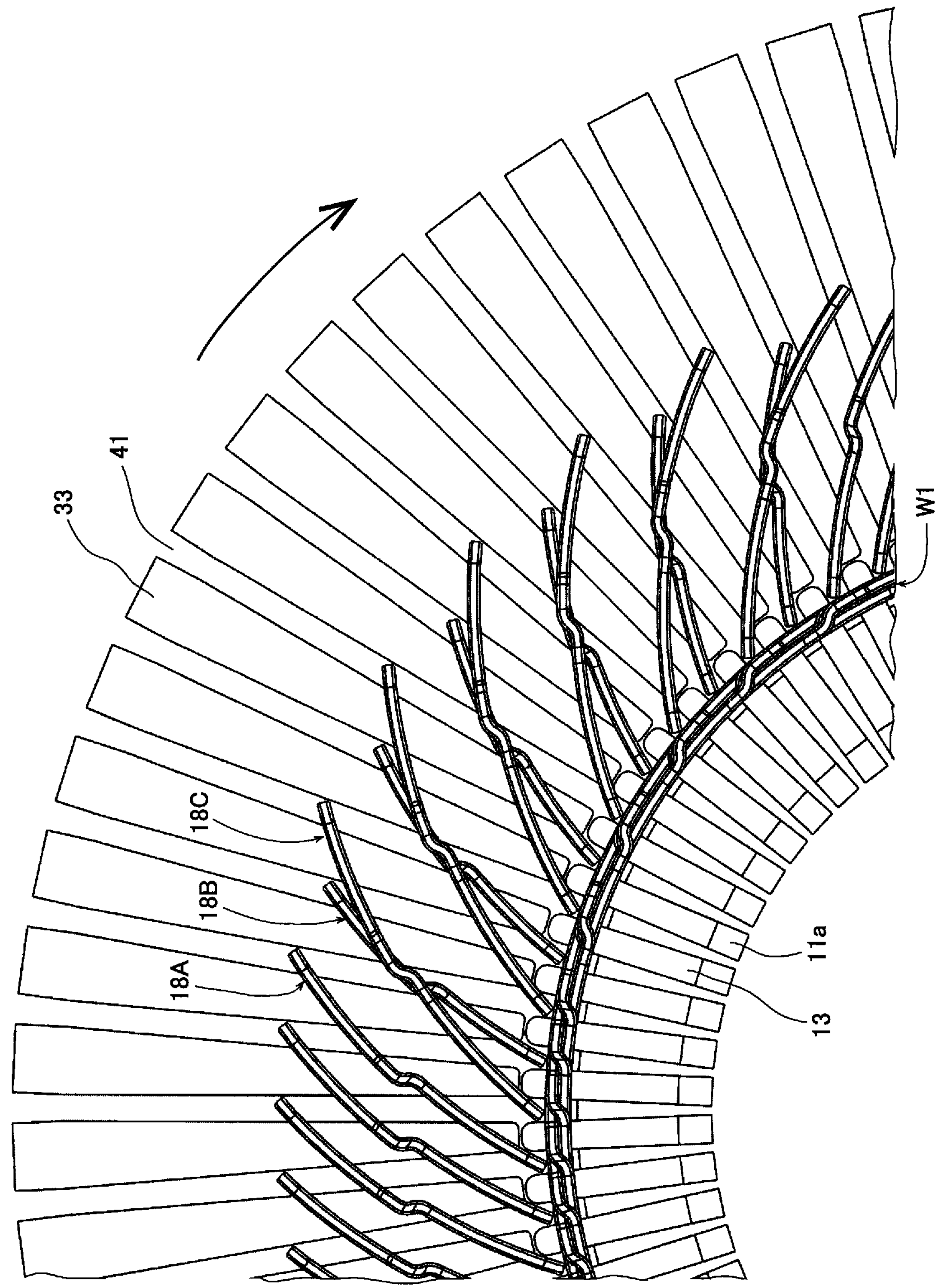
[Fig.17]

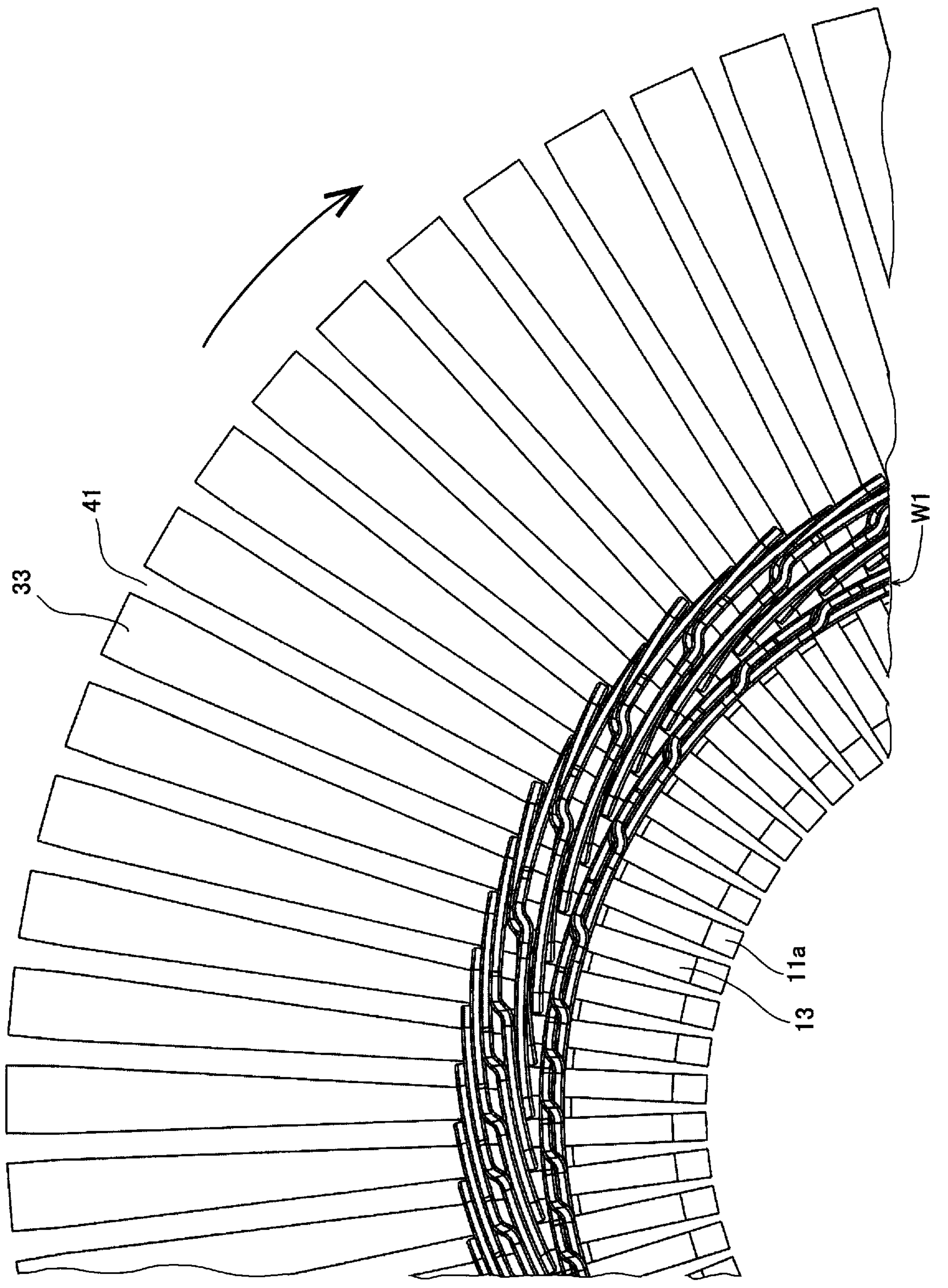
[Fig.18]

[Fig.19]
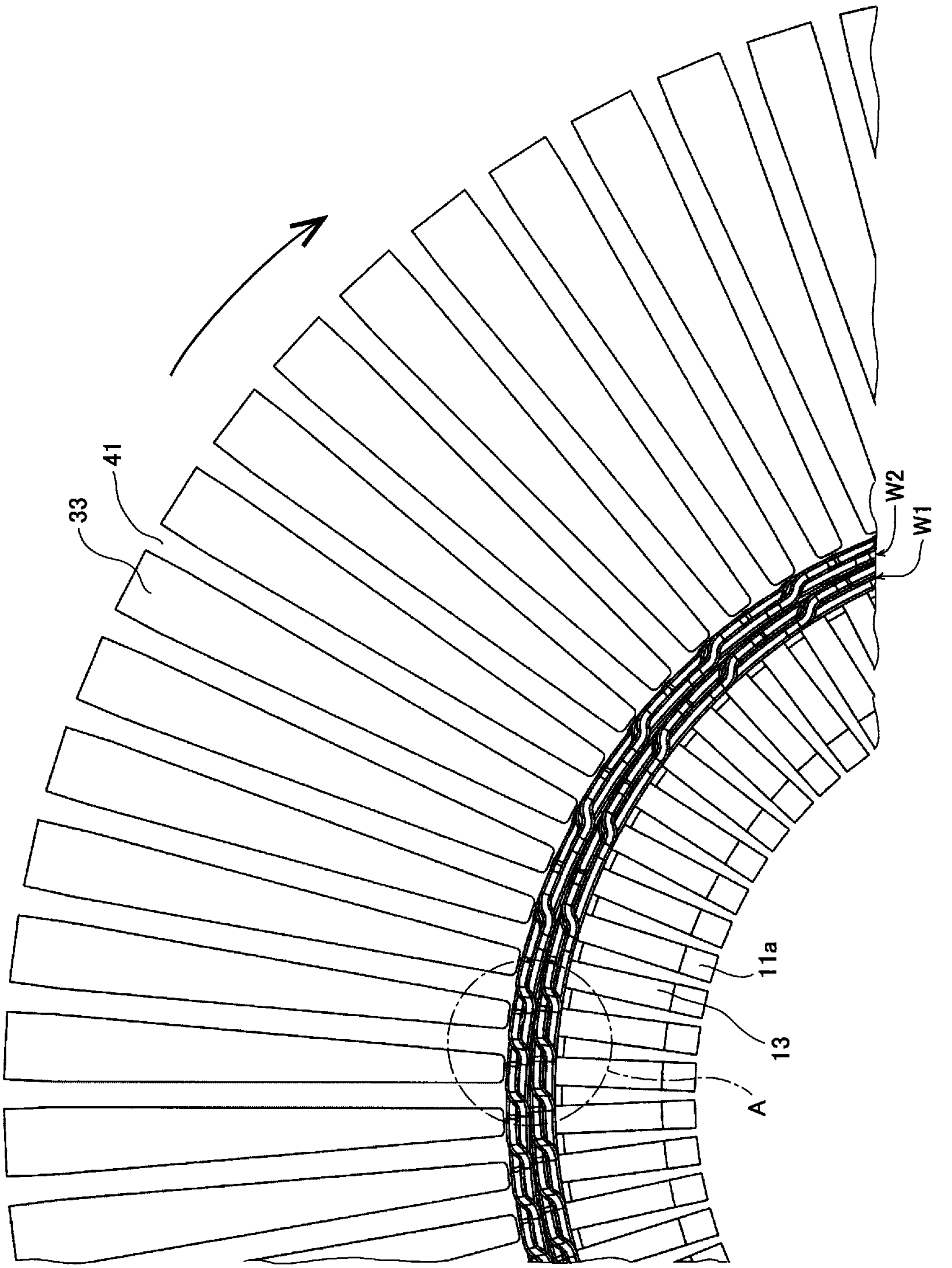

[Fig.20A]
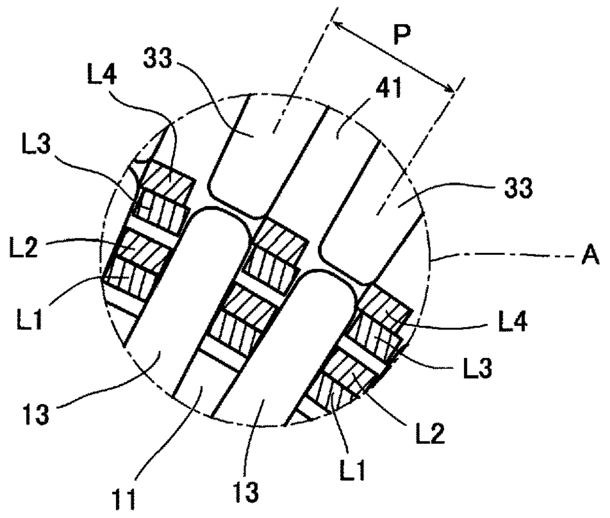
[Fig.20B]
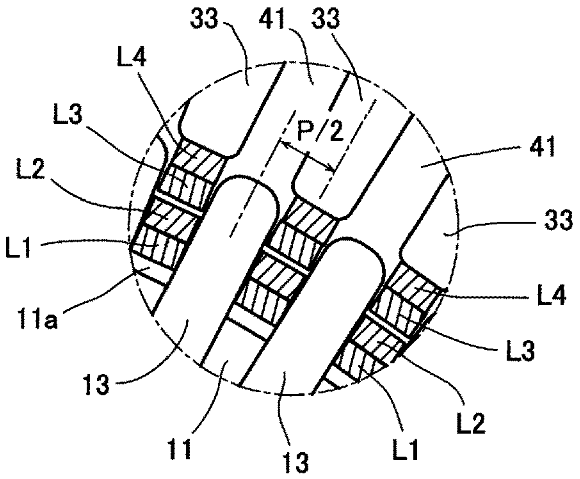
[Fig.20C]
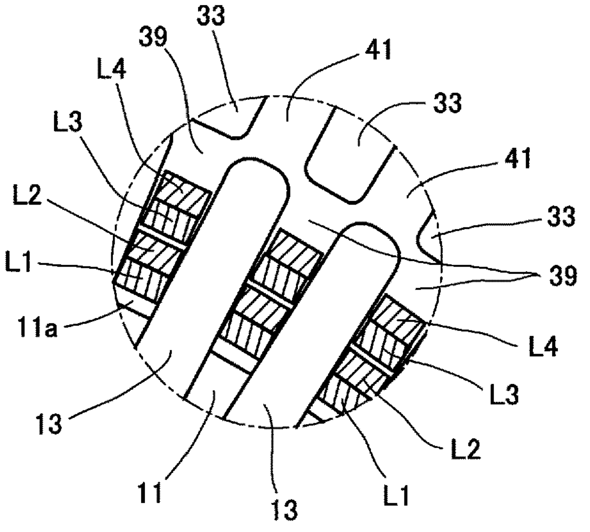

[Fig.21]
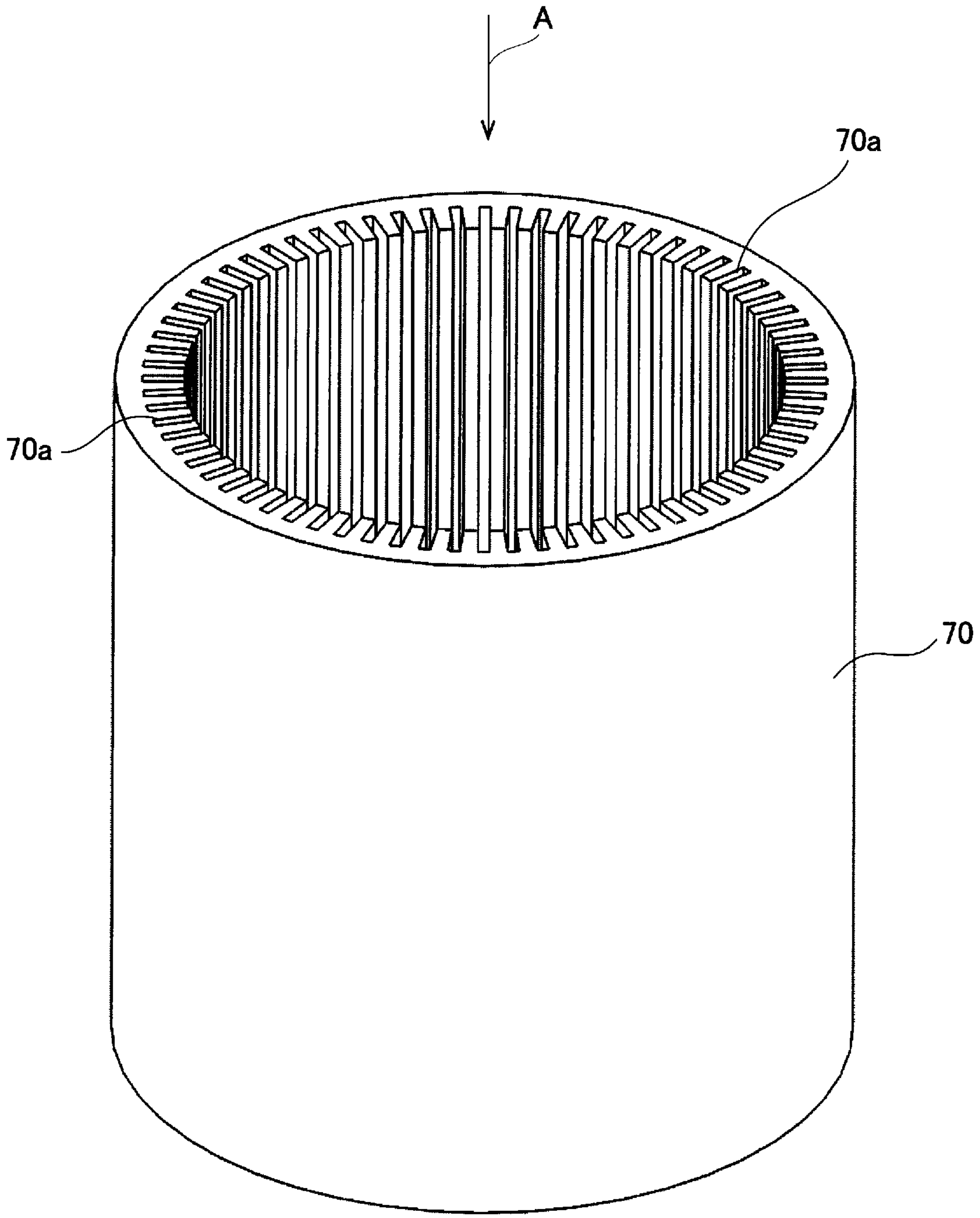

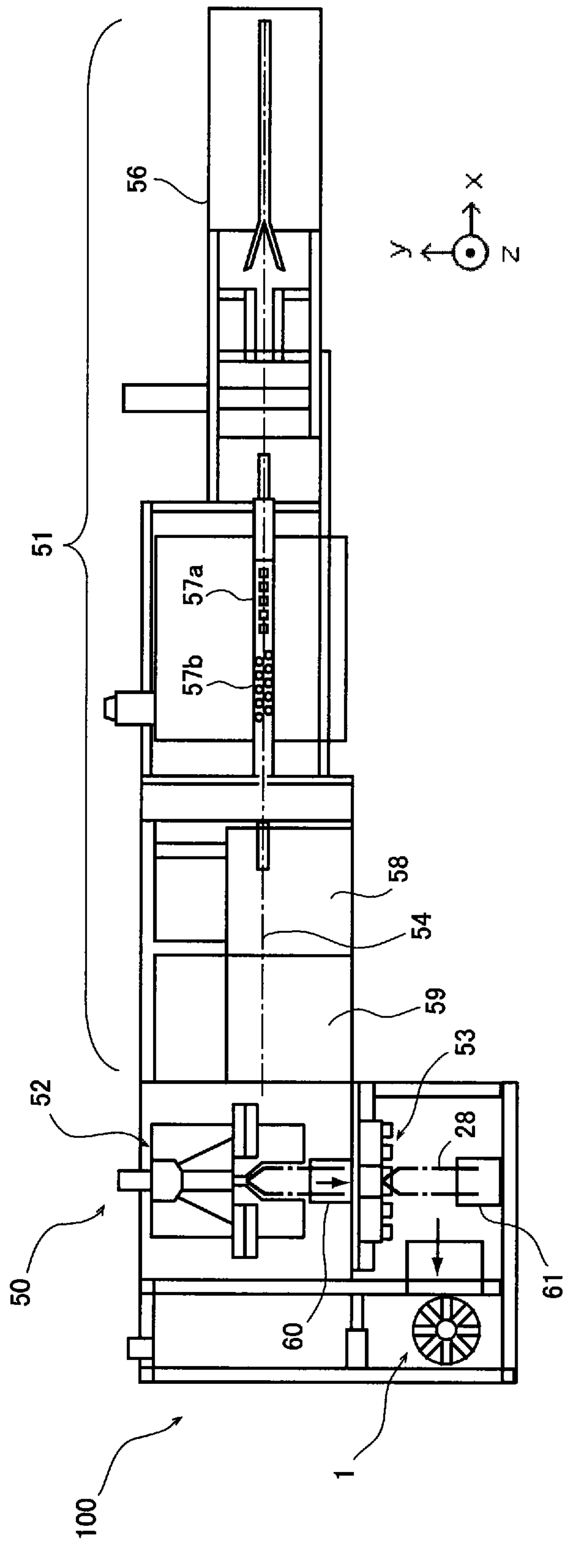
[Fig.22A]

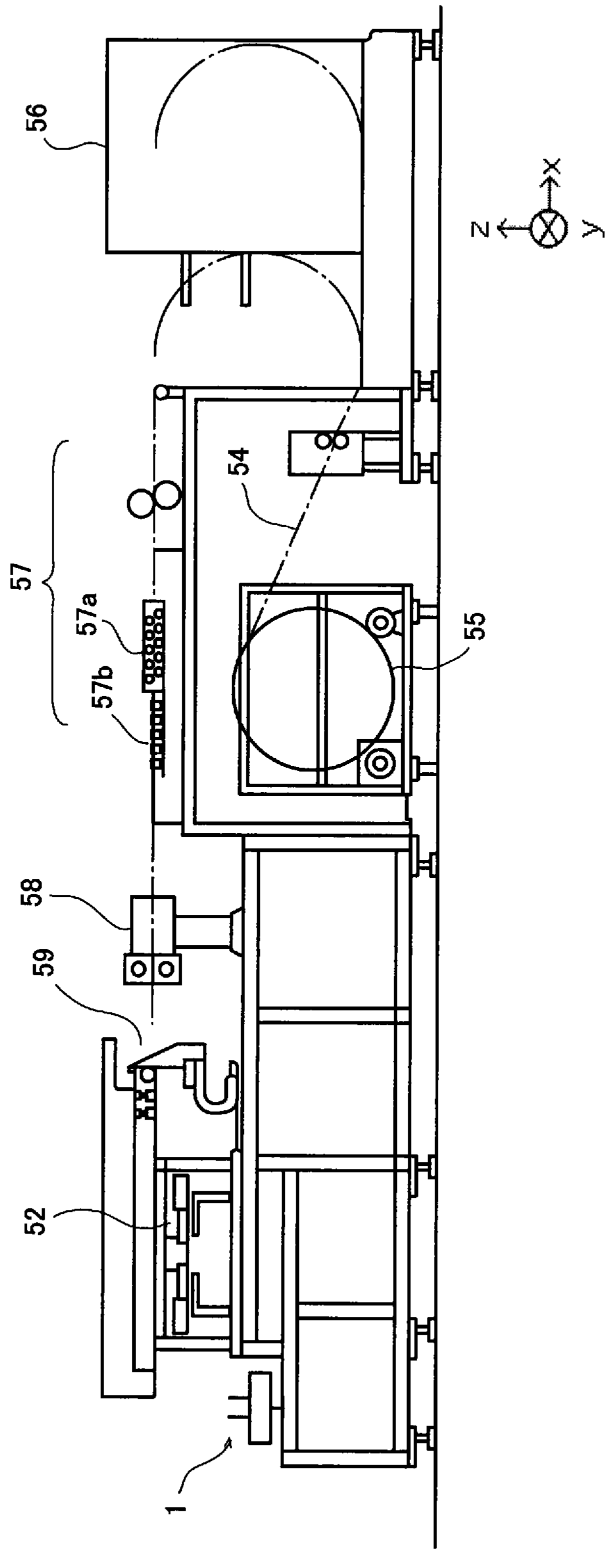
[Fig.22B]

COIL FORMING APPARATUS AND COIL FORMING METHOD

TECHNICAL FIELD

The present invention relates to a coil forming apparatus and a coil forming method for forming (assembling) a segment type coil formed by inserting a plurality of coil segments into slots of a stator or a rotor in an electrical rotating machine (rotating electric machine) such as a motor or a generator.

BACKGROUND ART

As a coil of a stator or a rotor in an electrical rotating machine, so-called a segment type coil is known, wherein a plurality of slots are arranged along the circumferential direction of the core of the stator or the rotor, a coil segment (hereinafter, simply referred to as a segment) formed by processing a linear wire rod of a predetermined length into a U-shape is inserted into each of the slots, the free ends (ends in the insertion direction) of the segments are electrically joined to each other by welding or the like after twisting the free ends. This type of coil segment is also referred to as a hairpin, and its bent shape is also referred to as a pine needle shape.

Linking portion of this type of coil segment has a crank shape for arranging its slot insertion portions (straight portions) extending in straight lines in different layers, so that two layers can be formed simultaneously by arranging a plurality of coil segments in the circumferential direction. PTL1 discloses a configuration for temporarily assembling U-shaped conductors by arranging the conductors while shifting each conductor for a predetermined pitch in the circumferential direction so that the conductors straddle a flat plate-shaped thin plate guide disposed radially about the rotation axis of the rotor. In the temporary assembling apparatus disclosed in PTL1, the upper end of the thin plate guide has an upward slope toward the radial direction outward, the arranged conductor segments can be slid by its own weight to the inner peripheral side. Then, the apparatus carries out a step of lifting all the conductor segments which have been moved to the inner circumferential side each time the second and subsequent conductor segments are inserted on the thin plate guide, so as to align all the conductor segments by positioning respective conductor segments under the turn portions (crank-shaped portions) of the previously added conductor segment.

CITATION LIST

Patent Literature

[PTL1] Japanese Patent Application Laid-Open Publication No. 2016-63588

SUMMARY OF INVENTION

Technical Problem

However, in the method described in PTL1, as described above, since a step of lifting all the conductor segments which have been moved to the inner circumference side every time the second and subsequent conductor segments are inserted is necessary, the number of lifting operations is very large and troublesome. In other words, it is necessary to carry out the lifting step of almost the entire number of conductor segments required for coil formation is required, thereby reducing the operational efficiency of the coil assembly process.

The present invention is made in view of the above, and an object of the present invention is to improve the efficiency of the coil assembling operation.

Solution to Problem

In order to achieve the above object, the present invention provides a configuration including a member for holding one (first slot insertion portion) of slot insertion portions of a coil segment as a pivot shaft so as to avoid interference at the linking portion (crank-shaped portion) thereof at the time of placing the coil segment, and the member is moved at a predetermined timing so that it is possible to avoid interference with the other slot insertion portion (second slot insertion portion).

Specifically, the coil forming apparatus of the present invention comprises: an inner member including a first receiving portion configured to receive a first insertion portion of each of a plurality of coil segments inserted at substantially equal intervals in a first direction corresponding to a circumferential direction of a stator or rotor, the coil segment comprising a pair of slot insertion portions to be respectively inserted into slots of the stator or rotor and a linking portion connecting the slot insertion portions; an outer member comprising a second receiving portion configured to receive a second slot insertion portion, different from the first insertion portion, of each of the plurality of coil segments inserted at substantially equal intervals in the first direction, the outer member being configured to displace the each second slot insertion portion to move closer to the inner member by rotation of the outer member; a holding member configured to hold the each first slot insertion portion such that the first slot insertion portion becomes a pivot of the coil segment when the outer member is rotated; and a mechanism configured to move the holding member so as to avoid interference between the second slot insertion portion and the holding member due to the rotation of the outer member.

In such a coil forming device, it is conceivable that the holding member is movable along a longitudinal direction of the first slot insertion portion, and is movable beyond a longitudinal length of the first slot insertion portion.

Furthermore, it is conceivable that the inner member comprises a plurality of inner movable members disposed radially corresponding to number of the slots and movable in a second direction corresponding to a radial direction of the stator or rotor, the outer member comprises a plurality of outer movable members disposed radially, respectively opposed to the inner movable members, movable in the second direction, and integrally rotatable in the first direction, and each first slot insertion portion is configured to be inserted into the first receiving portion formed between the inner movable members, and each second slot insertion portion is configured to be inserted into the second receiving portion formed between the outer movable members.

Further, it is conceivable that the holding member comprises a plurality of insertion holes configured to accept the respective first slot insertion portions, the insertion holes being arranged at substantially equal intervals in the first direction, the holding member is movable along a longitudinal direction of the first slot insertion portion, and the respective first slot insertion portions are configured to exit from the respective insertion holes due to movement of the holding member.

Further, it is conceivable that the holding member is interchangeable according to difference in diameter of layers of the coil segment.

Further, it is conceivable that the holding member is disc-shaped and divided into two semicircular portions, each of the semicircular portions being detachable from the coil forming apparatus along a direction perpendicular to the pivot of the coil segment.

Further, it is conceivable that the respective outer movable members are configured to push the respective first slot insertion portions inserted between the respective inner movable members, toward central direction of the inner member due to integrated rotation of the outer movable members in the first direction.

Further, the coil forming method of the present invention comprises: holding, by a holding member, a first slot insertion portion of each of a plurality of coil segments comprising a pair of slot insertion portions to be respectively inserted into slots of the stator or rotor and a linking portion connecting the slot insertion portions such that the respective first insertion portions are positioned at substantially equal intervals in a first direction corresponding to a circumferential direction of the stator or rotor; rotating the plurality of coil segments in one direction around the respective first slot insertion portions as pivots such that respective coil segments are overlapped with one another and a second slot insertion portion, different from the first slot insertion portion, of one coil segment is overlapped with the first slot insertion portion of another coil segment, thereby forming two coil segment layers at a time, wherein the holding member is moved so that the holding member does not interfere with the second slot insertion portions when the respective second slot insertion portions are overlapped with the respective first slot insertion portions.

In such a coil forming method, it is conceivable that the rotating is performed in a state where the second slot insertion portions of the respective coil segments are respectively inserted between a plurality of outer movable members disposed radially and rotatable integrally in the first direction, and the method comprises arranging, before the rotating, at least one of the plurality of coil segments obliquely with respect to a second direction corresponding to a radial direction of the stator or rotor such that the linking portion of the at least one coil segment is supported on the outer movable member.

Effect of the Invention

According to the present invention, the efficiency of the coil assembling operation can be improved.

BRIEF DESCRIPTION OF DRAWINGS

FIG. 1 is a schematic plan view of a coil forming apparatus according to an embodiment of the present invention.

FIG. 2 is a schematic cross-sectional view taken along II-II line in FIG. 1.

FIG. 3A is a plan view illustrating a holding member in the coil forming apparatus of FIG. 1.

FIG. 3B is a cross-sectional view taken along III-III line in FIG. 3A.

FIG. 4A is a plan view illustrating a circular block in the coil forming apparatus of FIG. 1.

FIG. 4B is a schematic cross-sectional view taken along IV-IV line in FIG. 4A.

FIG. 5A is a plan view illustrating a top plate in the coil forming apparatus of FIG. 1.

FIG. 5B is a schematic cross-sectional view take along V-V line in FIG. 5A.

FIG. 6A is a plan view showing a bottom plate in the coil forming apparatus of FIG. 1.

FIG. 6B is a schematic cross-sectional view taken along VI-VI line in FIG. 6A.

FIG. 7 is a perspective view illustrating a relevant part of an insertion position of a coil segment in the coil forming apparatus of FIG. 1.

FIG. 8 is an enlarged plan view illustrating a relevant part of an arrangement state of coil segments in the coil forming apparatus of FIG. 1.

FIG. 9 is an overall plan view illustrating an arrangement state of coil segments in the coil forming apparatus of FIG. 1.

FIG. 10 is an overall perspective view illustrating an arrangement state of coil segments in the coil forming apparatus of FIG. 1.

FIG. 11 is an enlarged plan view illustrating a relevant part of a state after integrated rotation of outer rods from the state of FIG. 8.

FIG. 12 is an enlarged plan view illustrating a relevant part of a state after further rotation of the outer rods from the state of FIG. 11.

FIG. 13 is a view corresponding to FIG. 2, illustrating a state in which the holding member in the coil forming apparatus of FIG. 1 is lowered.

FIG. 14 is an enlarged plan view illustrating a relevant part of a state in which coil formation of the first layer and the second layer is completed by further advancing rotation of the outer rods from the state of FIG. 12.

FIG. 15 is an enlarged plan view illustrating a relevant part of a state in which insertion gaps for slot insertion portions of coil segments of a third layer and a fourth layer are formed by radially moving the outer rods and the inner rods from the state of FIG. 14.

FIG. 16 is an enlarged plan view illustrating a relevant part of a state in which the coil segments of the third layer and the fourth layer are arranged from the state of FIG. 15.

FIG. 17 is an enlarged plan view illustrating a relevant part of a state after integrated rotation of the outer rods from the state of FIG. 16.

FIG. 18 is an enlarged plan view illustrating a relevant part of a state after further rotation of the outer rods from the state of FIG. 17.

FIG. 19 is an enlarged plan view illustrating a relevant part of a state in which coil formation of the third layer and the fourth layer is completed by further advancing rotation of the outer rods from the state of FIG. 18.

FIG. 20A is an enlarged horizontal sectional view of A portion in the state of FIG. 19, and is a view showing a state in which coil formation of the third layer and the fourth layer is completed.

FIG. 20B is a diagram illustrating a state in which the third and fourth layers are pushed by rotating the outer rods by half pitch from the state of FIG. 20A.

FIG. 20C is a diagram illustrating a state in which a gap for inserting slot insertion portions of the next layer is formed from the state of FIG. 20B.

FIG. 21 is a perspective view illustrating a core of a stator having slots into which a coil formed by the coil forming apparatus is inserted.

FIG. 22A is a schematic plan view illustrating a manufacturing apparatus of an electrical rotating machine.

FIG. 22B is a schematic side view corresponding to FIG. 22A.

DESCRIPTION OF EMBODIMENTS

Hereinafter an embodiment of the present invention will be described with reference to the drawings.

FIG. 1 is a plan view illustrating a coil forming apparatus 1 according to the present embodiment, and FIG. 2 is an enlarged cross-sectional view taken along II-II line in FIG. 1. Note that FIG. 1 illustrates a state in which the top plate 17 described later is removed. As shown in FIG. 2, the coil forming apparatus 1 includes: a base 3, a prop 5 vertically fixed to the center of the base 3; a support ring 7 integrally fixed to the prop 5; a circular block 11 inserted to the prop 5 from upper side of the support ring 7 and fixed to the support ring 7 by four bolts 9; a plurality of housing grooves 11*a* formed on the outer circumferential portion of the circular block 11 at equal intervals, each of which has opened outerside portion in the radial direction; a plurality of inner rods 13 as movable members housed in respective housing grooves 11*a* and movable in the radial direction; a disc-shaped bottom plate 15 covering the lower surface of respective housing grooves 11*a* and fixed to the lower surface of the circular block 11; a disc-shaped top plate 17 covering the upper surface of respective housing grooves 11*a* and fixed to the upper surface of the circular block 11; a disc-shaped holding member 19 disposed on the lower surface of the bottom plate 15 and holding (restraining) one of the slot insertion portions of the coil segment 18; a disc-shaped base plate 23 rotatably supported through a bearing member 21 at the lower portion of the prop 5; four support shafts 27 arranged at 90° intervals on the peripheral edge of the base plate 23 and fixed by bolts 25 from the lower surface side; a ring member 29 fixed through the screw holes 29*a* on the upper surface of these support shafts 27 and provided with recesses 29*b* (see FIG. 1) substantially equally spaced in the circumferential direction on the upper surface side thereof; a plurality of outer rods 33 as an outer movable member fixed by fixing screws 31, outer ends of respective outer rods being housed in the respective recesses 29*b* of the ring member 29; and so on. The circular block 11 and a plurality of inner rods 13 among the above constitute the inner member, and the ring member 29 and the outer rods 33 constitute the outer member.

As shown in FIG. 2, the coil segment 18 formed by bending a conductor with its outer surface coated with an insulating material is in a U-shape and has slot insertion portions 18*a*, 18*b* extending in a straight line, and a linking portion 18*c* connecting them. Linking portion 18*c* is in a crank shape (bent shape) to allow arrangement (lane change) of the slot insertion portion 18*a*, 18*b* to different layers. The layers are circumferential rows formed by slot insertion portions of a plurality of coil segments, and the number of slot insertion portions aligned in the radial direction of the core is the number of layers (see L1, L2, L3, and L4 in FIGS. 20A-20C).

The holding member 19 which is in a disc-shape as a whole is, as shown in FIG. 3A and FIG. 3B, formed by butting the semicircular divided plates 19A, 19B with each other. The holding member 19 includes, as a whole: an insertion hole 19*a* having a diameter larger than that of the outer diameter of the bearing member 21 in the center; screw holes 19*b* to which lower end portions of four long bolts 35 are respectively screwed to be fixed; and a plurality of insertion holes 19*c* formed at substantially equal intervals in the circumferential direction on the outer peripheral edge, to which respective ones of the slot insertion portions (first slot insertion portions 18*a*) of the coil segments 18 will be respectively inserted. When forming next two layers after forming a coil of two layers, the holding member 19 should be removed from the ling bolts 35 and replaced to another one. Since the holding member 19 is halved, the respective divided plates 19A, 19B can be removed from the coil forming apparatus 1 by pulling them out in a direction substantially perpendicular to the axis of the prop 5 (this direction is also a direction substantially perpendicular to the longitudinal direction of the slot insertion portions 18*a* inserted through the insertion holes 19*c*), and then new divided plates 19A, 19B can be inserted from the same direction, thereby replacement of the holding member 19 can be easily conducted. This replacement is, as will be described later, performed in a state where the holding member 19 is lowered (moved in a direction away from the bottom plate 15 along the prop 5) than the state shown in FIG. 2. The holding member 19 is not limited to the halved configuration, and may be divided into three or more parts.

The holding member 19 is not fixed to the circular block 11. The holding member 19 is fixed to the long bolts 35. The long bolts 35 are inserted into only the insertion holes 11*d*, in relation to the circular block 11 (see FIG. 4A and FIG. 4B). The long bolts 35 are not fixed to the circular block 11. Similarly, the long bolts 35 are not fixed to the top plate 17 and the bottom plate 15.

Further, in FIG. 2, the long bolts 35 are supported by the not shown support mechanism so as not to fall downward. In other words, the support mechanism supports the long bolts 35 so that the holding member 19 does not fall, i.e., to maintain a state where the holding member 19 holds one of the slot insertion portions 18*a* of the coil segment 18.

The circular block 11 includes, as shown in FIG. 4A and FIG. 4B: a plurality of housing grooves 11*a* for housing the respective inner rods 13; an insertion hole 11*b* for inserting the prop 5 therethrough; insertion holes 11*c* for inserting the respective bolts 9 therethrough; insertion holes 11*d* for inserting the respective long bolts 35 therethrough; and screw holes 11*e* for fixing the bottom plate 15 and the top plate 17. Seventy-two housing grooves 11*a* are formed at 5° intervals. Therefore, the inner rods 13 housed in the respective housing grooves 11*a* are also seventy-two pieces, provided radially at 5° intervals. The inner rods 13 are housed movably in the radial direction in the housing grooves 11*a*. The housing grooves 11*a* are spaces partitioned by the projecting edges 11*f* projecting radially in the radial direction.

Top plate 17 includes, as shown in FIG. 5A and FIG. 5B: an insertion hole 17*a* for inserting the prop 5 therethrough; insertion holes 17*b* for inserting the long bolt 35 therethrough; insertion holes 17*c* for inserting a screw for fixing the top plate 17 to the circular block 11 therethrough; a plurality of screw holes 17*d* formed at substantially equal intervals in the circumferential direction (first direction corresponding to the circumferential direction of a stator or rotor (see FIG. 21) to which a coil formed by the coil forming apparatus 1 is to be inserted) on the outer peripheral edge. As shown in FIG. 2, a fixing screw 37 is screwed into each of the screw holes 17*d*. By pressing the upper surface of the inner rod 13 with the fixing screw 37, the inner rod 13 is fixed at an arbitrary position in the radial direction (the second direction corresponding to the radial direction of the stator or rotor). That is, the fixing screw 37 function as a position adjusting member of the inner rod 13. As shown in FIG. 1, a long hole 33*a* is formed on each outer rod 33, so that the fixing position in the radial direction can be adjusted. Each outer rod 33 is disposed opposite to each inner rod 13, thus the outer rods 33 are also seventy-two pieces, provided radially at 5° intervals. In this embodiment, the inner rods 13 and the outer rods 33 are radially arranged at intervals of 5°, but the arrangement interval (arrangement angle) is not limited thereto.

The bottom plate 15 is a support member for supporting the lower surface of each inner rod 13. As shown in FIG. 6A and FIG. 6B, the bottom plate 15 includes: an insertion hole 15*a* for inserting the prop 5 therethrough; insertion holes 15*b* for inserting the respective long bolts 35 therethrough; and insertion holes 15*c* for inserting a screw for fixing the bottom plate 15 to the circular block 11 therethrough.

Arrangement of coil segments 18 in the coil forming apparatus 1 having the above configuration will be described. As shown in FIG. 7, one slot insertion portion 18*a* of the coil segment 18 is inserted into the gap 39 which is a first receiving portion formed between adjacent inner rods 13 in the circumferential direction, and further inserted into the insertion hole 19*c* of the holding member 19. That is, the one slot insertion portion 18*a* is restrained at the position of the through hole 19*c* of the holding member 19 due to insertion therethrough, and becomes the pivot when the coil segment 18 is rotated. Radially inner side of the gap 39 one of the slot insertion portion 18*a* is inserted is partitioned by the projecting edge 11*f*. In order to clearly illustrate the relationship between the inner rods 13 and the outer rods 33, the height of the circular block 11 is illustrated larger in FIG. 7 (the same in FIG. 10). Actually, as shown in FIG. 2, the heights of the inner rods 13 and the outer rods 33 are similar to that of the circular block 11.

The other slot insertion portion (second slot insertion portion) 18*b* of the coil segment 18 is inserted into the gap 41 which is a second receiving portion formed between adjacent outer rods 33 in the circumferential direction, as shown in FIG. 8. In this embodiment, three types of variant coil segments 18A, 18B, 18C are arranged to connect the coil to the power supply. In this embodiment, six coil segments 18B having the smallest width of the linking portion 18*c* are arranged, and the straddling angle thereof (angle between the gaps 39 in which the slot insertion portions 18*a*, 18*b* are respectively positioned in the state where the coil is completed (state in FIG. 14)) is 25°. Sixty coil segments 18A are arranged, and the straddling angle thereof is 30°. Six coil segments 18C having the largest width of the linking portion 18*c* are arranged from above the coil segments 18B, and the straddling angle thereof is 35°. Into which gap 41, between the outer rods 33, each slot insertion portion 18*b* should be inserted is predetermined for each type of the coil segment such that the coil segments 18A, 18B, 18C arranged so as to have the above straddling angles closely overlap one another to form two layers when the coil segments are rotated.

That is, as shown in FIG. 8, the slot insertion portion 18*b* of the coil segment 18A is inserted into the gap 41 at a position off by one in the circumferential direction as viewed from the gap 39 to which the slot insertion portion 18*a* is inserted. The slot insertion portion 18*b* of the coil segment 18B is inserted into the gap 41 opposing the gap 39 to which the slot insertion portion 18*a* is inserted. The slot insertion portion 18*a* of the coil segment 18C is inserted into the gap 41 at a position off by two in the circumferential direction as viewed from the gap 39 to which the slot insertion portion 18*a* is inserted. Incidentally, an arrangement of inserting the slot insertion portion 18*a* and the slot insertion portion 18*b* into the gaps at positions off by n-gaps from each other is hereinafter referred to as "n-gaps jump".

In addition to the arrangement shown in FIG. 8, such arrangement is conceivable that the coil segments 18A are arranged to be two-gaps jump, the coil segments 18B are arranged to be one-gap jump, and the coil segments 18C are arranged to be three-gaps jump. In this arrangement, all of the coil segments 18A, 18B, 18C are arranged obliquely with respect to the radial direction, and the crossover portions 18*c* of all the coil segments are supported on the upper surfaces of the outer rods 33. FIG. 9 is an overall plan view illustrating the arrangement state of the coil segments 18A, 18B, 18C partially shown in FIG. 8, and FIG. 10 is an overall perspective view thereof. In the example of FIG. 8 to FIG. 10, the direction of "off" in "n-gaps jump" is clockwise. However, it is also possible to employ "off" in counterclockwise direction, depending on shapes of the coil segments.

Next, when rotating the ring member 29 integrally supporting each outer rod 33 clockwise (the direction to which the linking portion 18*c* of the coil segment is curved) from the state shown in FIG. 8 to FIG. 10, as shown in FIG. 11, the slot insertion portion 18*b* of each coil segment 18A, 18B, 18C is pushed and displaced around the slot insertion portion 18*a* as a pivot, so that each coil segment 18A, 18B, 18C rotates toward the inner rod 13 side. That is, the slot insertion portion 18*b* moves while being pressed by the front side surface in the rotation direction of the rear side outer rod 33 in the rotation direction among the outer rods 33 constituting the gap 41 in which the slot insertion portion 18*b* is inserted, and sliding on the side surface. When the rotation of the coil segments progresses, as shown in FIG. 12, the degree of overlap (degree of closeness) in the radial direction among each coil segment 18A, 18B, 18C is increased. However, as is apparent from FIG. 7, since the slot insertion portion 18*b* of each coil segment 18A, 18B, 18C becomes in contact with the outer peripheral surface 19*d* of the holding member 19, closer state than that cannot be achieved.

Here, by releasing the four long bolts 35 through operation of the support mechanism supporting the long bolts 35 fixed to the holding member 19, as shown in FIG. 13, the holding member 19 is lowered (dropped), thereby the holding member 19 is retracted from the rotation area of the slot insertion portions 18*b*, and the slot insertion portions 18*a* are released. Thus, the interference between the slot insertion portions 18*b* and the holding member 19 is eliminated (avoided), and further rotation of the ring member 29 becomes possible. Finally, as shown in FIG. 14, each coil segment 18A, 18B, 18C are closely overlapped one another and thereby coil segment layer W1 having two layers is formed. In this state, the slot insertion portion 18*a* of one coil segment of each coil segment 18A, 18B, and 18C overlaps with the slot insertion portion 18*b* of another coil segment (see L1 and L2 in FIG. 20A to FIG. 20C). Conversely, the straddle angle and arrangement of each coil segment are defined to form such overlap. Timing for lowering the holding member 19 may be at a time when the slot insertion portions 18*b* comes in contact with the outer peripheral surface of the holding member 19, or a timing immediately before the contact.

Conventionally, it is performed to arrange the coil segments along the radial direction rather than oblique direction. However, in this arrangement, it is impossible to arrange coil segments having different straddling angles at a time. Therefore, it has been necessary to repeat a step of rotating the other slot insertion portion by a predetermined angle and then positioning a coil segment of next type along the radial direction, for each variant coil segment. It is troublesome. As in the present embodiment, by positioning the coil segments obliquely so as to be able to absorb the difference in straddling angles from the beginning, coil segments with different straddling angles can be arranged at a time, and thus the efficiency of the arrangement work of the coil segments can be improved.

Next, an operation of forming the third layer and the fourth layer will be described. As is apparent from FIG. 14, in a state where the first two layers are formed, there is no gap 39 between the inner rods 13 in the circumferential direction, and thus the coil segments 18 for forming the next layers cannot be positioned. Therefore, as shown in FIG. 15, the fixing screws 31 are loosened and the outer rods 33 are shifted radially outward, and the fixing screws 37 are loosened and the inner rods 13 are shifted radially outward, thereby newly forming gaps 39 between the inner rods 13. In FIG. 15, reference sign in shows the amount of movement in the radial direction of the inner rods 13. The outer rods 33 are moved by the same amount.

Further, before or after the positional adjustment of the inner rods 13 and the outer rods 33, the holding member 19 used for forming the first and second layers is removed from the long bolts 35, and replaced with another holding member 19 having a diameter suitable for forming the third and fourth layers. After the replacement, the long bolts 35 are moved to the upper limit position shown in FIG. 2 (the position where the holding member 19 is in contact or proximity to the bottom plate 15), and supported by a not shown support mechanism.

After the above, as shown in FIG. 16, one slot insertion portion 18*a* of each coil segment 18A, 18B, 18C is inserted into the newly formed gap 39 and the insertion hole 19*c* of the holding member 19 in the same manner as in the case of FIG. 7 to FIG. 10, and the other slot insertion portion 18*b* is inserted into the gap 41 between the outer rods 33 to arrange all the coil segments 18.

When rotating the ring member 29 clockwise from the state shown in FIG. 16, as shown in FIG. 17, the slot insertion portion 18*b* of each coil segment 18A, 18B, 18C is pushed and displaced around the slot insertion portion 18*a* as a pivot, so that each coil segment 18A, 18B, 18C rotates toward the inner rod 13 side. When the rotation of the coil segments progresses, as shown in FIG. 18, the degree of closeness in the radial direction among each coil segment 18A, 18B, 18C is increased. However, since the slot insertion portion 18*b* of each coil segment 18A, 18B, 18C becomes in contact with the outer peripheral surface 19*d* of the holding member 19 after the replacement, closer state than that cannot be achieved.

Here, by releasing the four long bolts 35 through operation of the support mechanism supporting the long bolts 35 fixed to the holding member 19, the holding member 19 is lowered (dropped), thereby the holding member 19 is retracted from the rotation area of the slot insertion portions 18*b*, and the slot insertion portions 18*a* are released. Thus, the interference between the slot insertion portions 18*b* and the holding member 19 is eliminated, and further rotation of the ring member 29 becomes possible. Finally, as shown in FIG. 19, each coil segment 18A, 18B, 18C are closely overlapped one another and thereby coil segment layer W2 having two layers is formed adjacent to the coil segment layer W1 of the firstly formed two layers. By repeating the above operation, a plurality of layers can be easily formed.

As described above, by holding the one slot insertion portion 18*a* in the holding member 19 and using it as a pivot, each coil segment 18A, 18B, 18C can be arranged in a state where the linking portions 18*c* thereof enter under another coil segment, and thus the lifting operation for entering the linking portions as in the case of PTL1 is not necessary. Further, it is possible to perform movement of the holding member 19 for eliminating interference with the slot insertion portions 18*b* collectively after the arrangement of all the coil segments for the two layers is completed. Accordingly, it is not necessary to move the holding member 19 for each insertion of one coil segment, resulting in high efficiency.

As shown in FIG. 20A, when formation of the third layer and the fourth layer by the coil segments is completed, the third layer and the fourth layer are shifted slightly in the circumferential direction, and protrudes to the outer rod 33 side than the outer ends of the inner rods 13. To improve this state, as shown in FIG. 20B, for example, the ring member 29 may be rotated so as to deviate each outer rod 33 by a half pitch (P/2) in the circumferential direction. In this way, the fourth layer L4 is pushed into the inner rod 13 side toward the central direction of the circular block 11 by the tip surfaces of the outer rods 33, and the third layer L3 and the fourth layer L4 can be housed in a state where they are aligned with the previously formed first layer L1 and the second layer L2 in the gaps 39 between the inner rods 13. By restraining the lower portion of the outer peripheral surface of the third layer and the fourth layer in this state with a ring-shaped member, it is possible to prevent the third layer when and the fourth layer from being misaligned when forming the next layers (fifth layer and sixth layer). The pushing of the coil segments by the outer rods 33 and the restraining by the ring-shaped member can be performed similarly even when formation of the first and second layers by the coil segments is completed or when formation of the fifth and subsequent layers by the coil segments is completed, to obtain the same effect.

Further, as shown in FIG. 20C, when formation of the third layer and the fourth layer by the coil segments is completed, the outer rods 33 and the inner rods 13 is radially moved outward to form gaps 39 for inserting one slot insertion portion 18*a* of the fifth layer and the sixth layer from the state of FIG. 20B, so it is possible to form a gap 39 with partitions on all of four sides. Accordingly, the slot insertion portion 18*a* can be easily inserted in the gaps 39 with high reliability, as compared with the case where the radially outer side of the gaps 39 is opened (see FIG. 15). The formation of the gaps 39 with partitions on all of four sides can be performed similarly even when formation of the first and second layers by the coil segments is completed or when formation of the fifth and subsequent layers by the coil segments is completed, to obtain the same effect.

When the coil formation (assembly) of the desired number of layers is completed, the coil forming apparatus 1 is positioned above the core 70 of the stator shown in FIG. 21 by a not shown moving mechanism, and aligned with the core 70 in a state where the lower end portion of the slot insertion portion is inserted into the slot 70*a*. The slot insertion portions of respective layers located in one gap 39 between adjacent inner rods 13 in the state of FIG. 20C are inserted into one slot 70*a*, and slot insertion portions located in respective gaps 39 are inserted into corresponding slots 70*a*, respectively. Thereafter, all the inner rods 13 are moved inward and all the outer rods 33 are moved outward, thereby the coil consisting of each layer of the assembled (braided) coil segments 18 is released and dropped in the direction indicated by arrow A to the slot 70*a*, and the insertion is completed. Conventionally, the braided coil is once pulled out from the coil forming apparatus and then inserted into the slots of the core. However, according to the configuration of this embodiment, the pulling-out process is not necessary, and there is an advantage that the completed coil can be dropped into the slots as it is without worrying that the layers are misaligned in the pulling-out process. An example of insertion into the core of the stator is shown here, but the insertion can be carried out in the same manner for the core of the rotor.

In the present embodiment, the position of the large number of inner rods 13 and outer rods 33 may be manually adjusted, or may also be adjusted by simultaneously moving all the inner rods 13 and outer rods 33 using cam grooves and a servo motor, or the like. Further, each divided plate 19A, 19B of the holding member 19 may be automatically inserted and replaced from a direction substantially perpendicular to the axial direction of the prop 5. The coil segment 18 may also be automatically arranged by a robot or the like. That is, based on the technical idea of the present invention, by automating: the arrangement of the coil segments 18; the integral rotation of respective outer rods 33 (although realized by the rotation of the ring member 29 in the example described above, other means may be used); elevation and replacement of the holding member 19; the adjustment of positions of the inner rods 13 and the outer rods 33 for forming the gaps 39; and the like, it is possible to construct a device for automatically forming a segment coil of a desired number of layers.

Hereinafter, with reference to FIG. 22A and FIG. 22B, an embodiment of a manufacturing device 100 of an electrical rotating machine that incorporates the above-described coil forming apparatus 1, i.e., an embodiment of a system that automatically performs a process from the supply of the wire to the coil formation (coil assembly).

The manufacturing device 100 of the electrical rotating machine includes a coil segment forming apparatus 50 and a coil forming apparatus 1 which correlates coil segments formed by the coil segment forming apparatus 50 with slots arranged annularly along the circumferential direction of the electrical rotating machine and assembles the coil segments. The coil segment forming device 50 includes: a wire rod supplying unit 51; a primary bending unit 52 configured to perform a bending process on a linear wire rod of a predetermined length supplied from the wire rod supplying unit 51 in one plane (x-y plane in the figures in this embodiment) for bending the wire rod into a predetermined shape (U-shape in this example); and a secondary bending unit 53 configured to perform a bending process on the coil segment (primarily bent body) bent by the primary bending unit 52 in another plane (y-z plane in the figures in this embodiment) perpendicular to both the slot insertion direction of the coil segment and the above described one plane and thereby forming a crank shape at the portion corresponding to the linking portion 18*c*.

The wire rod supplying unit 51 includes a bobbin 55, a supply direction changing unit 56, a straightening and conveying unit 57, a peeling unit 58, and a cutting unit 59. The bobbin 55 is wound with a flat wire, to be the wire rod 54, whose surface is covered with an insulating layer. The supply direction changing unit 56 draws the wire 54 from the bobbin 55 and changes the supply direction thereof. The straightening and conveying unit 57 includes: a plurality of roller pairs 57*a* configured to convey the wire 54 while sandwiching the broad flatwise surface of the wire 54; and a plurality of roller pairs 57*b* configured to convey the wire 54 while sandwiching the narrow edgewise surface of the wire 54, and straightens the longitudinal distortion of the wire 54. The peeling unit 58 is a coat peeling device for a wire, configured to peel off the insulating layer (coated film) in the peeling region provided for each predetermined length of the wire 54 whose distortion is straightened. The cutting unit 59 cuts the wire 54 that passed through the peeing unit 58 in the peeling region.

The peeling unit 58 may employ a mechanical peeling method in which a peeling region (a portion where an insulating layer is to be peeled off) is scraped by a cutting member to peel off the insulating layer. The cutting unit 59 cuts the wire 54 at the center portion of each peeling region. Therefore, the wire 54 cut by the cutting unit 59 becomes a wire rod of a predetermined length wherein the insulating layer is removed at both ends thereof.

The primary bending unit 52 performs a U-bending process on the wire rods 54 obtained through the cutting by the cutting unit 59 so as to form the primarily bent body 28. The U-shaped primarily bent body 28 is transferred to the secondary bending unit 53 by a transfer mechanism 60 disposed between the primary bending unit 52 and the secondary bending unit 53. The transfer mechanism 60 is provided with a pair of chuck portions (not shown) utilizing an air cylinder, and the pair of chuck portions stand by with their chuck pieces being opened, at a region to which both legs of the primarily bent body 28 (corresponding to a pair of slot insertion portions 18*a*, 18*b*) are swung due to the bending. When the chuck portions grip both legs of the primarily bent body 28, the transfer mechanism 60 rises so as to remove the primarily bent body 28 from the primary bending unit 52, and transfers it to the secondary bending unit 53. The primarily bent body 28 transferred by the transfer mechanism 60 is gripped by the gripping member 61 at end portions of the both legs thereof. In a state where the transfer mechanism 60 which has passed the primarily bent body 28 to the gripping member 61 is retracted and the space of the coil end portion (corresponding to the linking portion 18*c*) side is cleared, the secondary bending unit 53 performs the bending process including bending for forming a stepped shape (crank shape), with respect to the coil end portion.

The secondary bent bodies (coil segments 18) after the bending process by the secondary bending unit 53 is sequentially arranged in the coil forming apparatus 1, by a not shown robot, such that the slot insertion portions 18*a* and 18*b* are respectively inserted into the gaps 39 and 41 as described with reference to FIG. 7 or the like. When the arrangement to the whole circumference is completed, by integrally rotating the plurality of outer rods 33, respective coil segments 18 are rotated.

Next, at a timing when the slot insertion portion 18*b* of the coil segment 18 abuts against the outer surface of the holding member 19, the not shown support mechanism releases the long bolts 35, or lowers the long bolts 35, thereby lowering the holding member 19. Then, final tightening is performed in a state where the interference between the slot insertion portion 18*b* and the holding member 19 is eliminated.

In the configuration shown in FIG. 22A and FIG. 22B, the supply direction changing unit 56, the straightening and conveying unit 57, the peeling unit 58, and the cutting unit 59 of the wire supply unit 51, and the primary bending unit 52 are arranged in a row in the transverse direction in FIG. 22A, the secondary bending unit 53 is disposed on the lower side in FIG. 22A with respect to the primary bending unit 52, and the coil forming apparatus 1 is disposed on the left side in FIG. 22A with respect to the secondary bending unit 53. However, the supply direction changing unit 56, the straightening and conveying unit 57, the peeling unit 58, the cutting unit 59, the primary bending unit 52, the secondary bending unit 53, and the coil forming apparatus 1 may be arranged in a row in the transverse direction in FIG. 22A. That is, there is no limitation of the relative arrangement position (layout) between the coil segment forming portion and the coil forming apparatus (coil assembly portion).

Preferred embodiments of the present invention are described above. However, the present invention is not limited to such specific embodiments, and various modifications and variations are conceivable. The above-described configuration of the present invention can be implemented by extracting only a part thereof, and the variations described in the above explanation can be applied in any combination as long as they do not conflict with each other. The effects described in the embodiments of the present invention are merely illustrative of the most preferred effects resulting from the present invention, and the effects according to the present invention are not limited to those described in the embodiments of the present invention.

REFERENCE SIGNS LIST

1 Coil forming device
13 Inner rod
19 Holding member
18*a*, 18*b* Slot insertion portion
18*c* Linking portion
33 Outer rod

The invention claimed is:

1. A coil forming apparatus comprising:

an inner member comprising a plurality of first receiving gaps arranged at substantially equal intervals in a first direction corresponding to a circumferential direction of a stator or rotor, the plurality of first receiving gaps being configured to respectively receive first slot insertion portions of a plurality of coil segments to be inserted into the plurality of first receiving gaps, each of the plurality of coil segments comprising first and second slot insertion portions to be respectively inserted into slots of the stator or rotor and a linking portion connecting the first and second slot insertion portions;

an outer member comprising a plurality of second receiving gaps arranged at substantially equal intervals in the first direction, the plurality of second receiving gaps being configured to respectively receive second slot insertion portions, different from the first slot insertion portions, of the plurality of coil segments to be inserted into the plurality of second receiving gaps, the outer member being configured to move the second slot insertion portions of the plurality of coil segments closer to the inner member by rotation of the outer member; and a first holding member comprising a plurality of recesses, the plurality of recesses being configured to respectively hold the first slot insertion portions of the plurality of coil segments therein such that the first slot insertion portions respectively become pivots of the plurality of coil segments when the outer member is rotated, the first holding member being movable from a first position where the first slot insertion portions of the plurality of coil segments are respectively held in the plurality of recesses to a second position where interference between the second slot insertion portions of the plurality of coil segments and the first holding member, due to the rotation of the outer member, is avoided.

2. The coil forming apparatus according to claim 1, wherein the first holding member is movable along a longitudinal direction of the first slot insertion portions being respectively held in the plurality of recesses, and is movable beyond a longitudinal length of the first slot insertion portions.

3. The coil forming apparatus according to claim 1, wherein the inner member comprises a plurality of inner movable members disposed radially corresponding to a number of the slots of the stator or rotor and movable in a second direction corresponding to a radial direction of the stator or rotor, the outer member comprises a plurality of outer movable members disposed radially, respectively opposed to the plurality of inner movable members, movable in the second direction, and integrally rotatable in the first direction, and the plurality of first receiving gaps are respectively formed between the plurality of inner movable members, and the plurality of second receiving gaps are respectively formed between the plurality of outer movable members.

4. The coil forming apparatus according to claim 3, wherein the plurality of outer movable members are configured to respectively push the plurality of first slot insertion portions respectively inserted between the plurality of inner movable members toward a central direction of the plurality of inner members due to an integrated rotation of the plurality of outer movable members in the first direction.

5. The coil forming apparatus according to claim 1, wherein the plurality of recesses of the first holding member are a plurality of insertion holes, the plurality of insertion holes being arranged at substantially equal intervals in the first direction, the first holding member is movable along a longitudinal direction of the first slot insertion portions being respectively held in the plurality of insertion holes, and the first slot insertion portions are configured to respectively exit from the plurality of insertion holes due to movement of the first holding member.

6. The coil forming apparatus according to claim 1, wherein, in the coil forming apparatus, the first holding member is interchangeable with a second holding member comprising a plurality of recesses that are configured to respectively hold first slot insertion portions of a plurality of coil segments of a second layer of coil segments having a diameter different from a diameter of a first layer of coil segments formed by the first slot insertion portions of the plurality of coil segments to be respectively held by the plurality of recesses of the first holding member.

7. The coil forming apparatus according to claim 6, wherein each of the first and second holding members is disc-shaped and divided into two semicircular portions, the two semicircular portions being detachable from the coil forming apparatus along a direction perpendicular to the pivots of the plurality of coil segments.

8. A coil forming method comprising:

holding, in a plurality of recesses of a first holding member, respective first slot insertion portions of a plurality of coil segments, each of the plurality of coil segments comprising first and second slot insertion portions to be respectively inserted into slots of a stator or rotor and a linking portion connecting the first and second slot insertion portions, such that the first slot insertion portions are positioned at substantially equal intervals in a first direction corresponding to a circumferential direction of the stator or rotor; and rotating the plurality of coil segments in one direction around respective first slot insertion portions as pivots such that respective coil segments are overlapped with one another and such that the second slot insertion portion, different from the first slot insertion portion, of one coil segment of the plurality of coil segments comes into contact with the first slot insertion portion of another coil segment of the plurality of coil segments, thereby forming two coil segment layers at a time, wherein the first holding member is moved during the rotating so that the first holding member does not interfere with the second slot insertion portion of the one coil segment when the second slot insertion portion of the one coil segment comes into contact with the first slot insertion portion of the another coil segment, and wherein the rotating is performed in a state where the second slot insertion portions of the plurality of coil segments are respectively inserted between a plurality of outer movable members disposed radially and rotatable integrally in the first direction, the method further comprising arranging, before the rotating, at least one of the plurality of coil segments obliquely with respect to a second direction corresponding to a radial direction of the stator or rotor such that the linking portion of the at least one coil segment is supported on at least one outer movable member of the plurality of outer movable members.

9. A coil forming method comprising:

holding, in a plurality of recesses of a first holding member, respective first slot insertion portions of a plurality of coil segments, each of the plurality of coil segments comprising first and second slot insertion portions to be respectively inserted into slots of a stator or rotor and a linking portion connecting the first and second slot insertion portions, such that the first slot insertion portions are positioned at substantially equal intervals in a first direction corresponding to a circumferential direction of the stator or rotor; and rotating the plurality of coil segments in one direction around respective first slot insertion portions as pivots such that respective coil segments are overlapped with one another and such that the second slot insertion portion, different from the first slot insertion portion, of one coil segment of the plurality of coil segments is overlapped with the first slot insertion portion of another coil segment of the plurality of coil segments, thereby forming two coil segment layers at a time, wherein the first holding member is moved so that the first holding member does not interfere with the second slot insertion portion of the one coil segment when the second slot insertion portion of the one coil segment is overlapped with the first slot insertion portion of the another coil segment, and wherein the coil forming method is performed by a coil forming apparatus comprising:

an inner member comprising a plurality of first receiving gaps configured to respectively receive the first slot insertion portions of the plurality of coil segments to be inserted into the plurality of first receiving gaps;

an outer member comprising a plurality of second receiving gaps arranged at substantially equal intervals in the first direction, the plurality of second receiving gaps being configured to respectively receive the second slot insertion portions of the plurality of coil segments to be inserted into the plurality of second receiving gaps, the outer member being configured to move the second slot insertion portions of the plurality of coil segments closer to the inner member by rotation of the outer member;

the first holding member comprising the plurality of recesses, the plurality of recesses being configured to respectively hold the first slot insertion portions of the plurality of coil segments therein such that the first slot insertion portions respectively become the pivots of the plurality of coil segments when the outer member is rotated, the first holding member being movable from a first position where the first slot insertion portions of the plurality of coil segments are respectively held in the plurality of recesses to a second position where interference between the second slot insertion portions of the plurality of coil segments and the first holding member, due to the rotation of the outer member, is avoided.

10. The coil forming method according to claim 9, wherein the inner member comprises a plurality of inner movable members disposed radially corresponding to a number of the slots of the stator or rotor and movable in a second direction corresponding to a radial direction of the stator or rotor, the outer member comprises a plurality of outer movable members disposed radially, respectively opposed to the plurality of inner movable members, movable in the second direction, and integrally rotatable in the first direction, and the plurality of first receiving gaps are respectively formed between the plurality of inner movable members, and the plurality of second receiving gaps are respectively formed between the plurality of outer movable members.

11. The coil forming method according to claim 10, wherein the plurality of outer movable members respectively push the plurality of first slot insertion portions respectively inserted between the plurality of inner movable members toward a central direction of the plurality of inner members due to an integrated rotation of the plurality of outer movable members in the first direction.

12. A coil forming method comprising:

holding, in a plurality of recesses of a first holding member, respective first slot insertion portions of a plurality of coil segments, each of the plurality of coil segments comprising first and second slot insertion portions to be respectively inserted into slots of a stator or rotor and a linking portion connecting the first and second slot insertion portions, such that the first slot insertion portions are positioned at substantially equal intervals in a first direction corresponding to a circumferential direction of the stator or rotor; and rotating the plurality of coil segments in one direction around respective first slot insertion portions as pivots such that respective coil segments are overlapped with one another and such that the second slot insertion portion, different from the first slot insertion portion, of one coil segment of the plurality of coil segments comes into contact with the first slot insertion portion of another coil segment of the plurality of coil segments, thereby forming two coil segment layers at a time, wherein the first holding member is moved during the rotating so that the first holding member does not interfere with the second slot insertion portion of the one coil segment when the second slot insertion portion of the one coil segment comes into contact with the first slot insertion portion of the another coil segment, wherein the first holding member is interchangeable with a second holding member comprising a plurality of recesses that are configured to respectively hold first slot insertion portions of a plurality of coil segments of a second layer of coil segments having a diameter different from a diameter of a first layer of coil segments formed by the first slot insertion portions of the plurality of coil segments to be respectively held by the plurality of recesses of the first holding member, and wherein each of the first and second holding members is disc-shaped and divided into two semicircular portions, the two semicircular portions being detachable from a coil forming apparatus, used to execute the coil forming method, along a direction perpendicular to the pivots of the plurality of coil segments.

* * * * *